US012726729B2

(12) United States Patent
Hirst

(10) Patent No.: US 12,726,729 B2
(45) Date of Patent: Sep. 1, 2026

(54) METHODS AND DEVICES TO DYNAMICALLY TUNE AN EXPOSURE TIME OF AN IMAGER FOR THREE-DIMENSIONAL PROFILING OF AN OBJECT

(71) Applicant: Zebra Technologies Corporation, Lincolnshire, IL (US)

(72) Inventor: Christopher Hirst, Pointe-Claire (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 91 days.

(21) Appl. No.: 18/938,619

(22) Filed: Nov. 6, 2024

(65) Prior Publication Data

US 2026/0129313 A1 May 7, 2026

(51) Int. Cl.

| | |
|---|---|
| ***H04N 25/583*** | (2023.01) |
| ***H04N 23/55*** | (2023.01) |
| ***H04N 23/73*** | (2023.01) |
| ***H04N 25/441*** | (2023.01) |

(52) U.S. Cl.

CPC ........... *H04N 25/583* (2023.01); *H04N 23/55* (2023.01); *H04N 23/73* (2023.01); *H04N 25/441* (2023.01)

(58) Field of Classification Search

CPC ...... H04N 25/583; H04N 23/55; H04N 23/73; H04N 25/441

See application file for complete search history.

(56) References Cited

U.S. PATENT DOCUMENTS

| | | | | |
|---|---|---|---|---|
| 11,409,303 | B2 * | 8/2022 | Seo | G06T 5/92 |
| 11,734,528 | B1 * | 8/2023 | Handshaw | G06K 7/10752 235/462.41 |
| 2014/0313367 | A1 * | 10/2014 | Iwasaki | G06F 18/22 348/222.1 |
| 2017/0186183 | A1 * | 6/2017 | Armstrong | G01B 11/14 |
| 2019/0082087 | A1 * | 3/2019 | Fleizach | H04N 23/71 |
| 2021/0144289 | A1 * | 5/2021 | Vdovychenko | H04N 23/76 |
| 2022/0207664 | A1 * | 6/2022 | Lin | H04N 23/73 |

FOREIGN PATENT DOCUMENTS

| | | | | |
|---|---|---|---|---|
| EP | 3054667 A1 * | 8/2016 | | H04N 23/56 |

* cited by examiner

*Primary Examiner* — Twyler L Haskins
*Assistant Examiner* — John H Morehead, III

(57) ABSTRACT

Methods and devices for dynamically tuning an exposure time of an imager are disclosed herein. The method captures, via an imaging assembly of a device, a first image of an object. The imaging assembly comprises a light source and at least one imager having a first exposure time during capture of the first image. The method determines an average number of a first class of pixels per column of pixels present in the first image and determines whether the average number of the first class of pixels per column of pixels is within a range. If the average number of the first class of pixels per column of pixels is not within the range, the method modifies the first exposure time of the at least one imager by one of decreasing or increasing the first exposure time of the at least one imager based on a classification of the first image.

30 Claims, 13 Drawing Sheets

START

302 Capturing, via an imaging assembly of a device, a first image of an object where the imaging assembly has a light source and at least one imager having a first exposure time during capture of the first image and the first image has a first region and a second region 304 Determine an average number of a first class of pixels per column of pixels present in the first image based on a number of the first class of pixels present in the first image and a number of columns of pixels of the first image 306 Average number of first class of pixels per column of pixels within a predetermined range?

YES

NO

308 Modify the first exposure time of the at least one imager by one of decreasing the first exposure time of the at least one imager or increasing the first exposure time of the at least one imager based on a classification of the first image 310 Capture additional image(s)

YES

NO

END

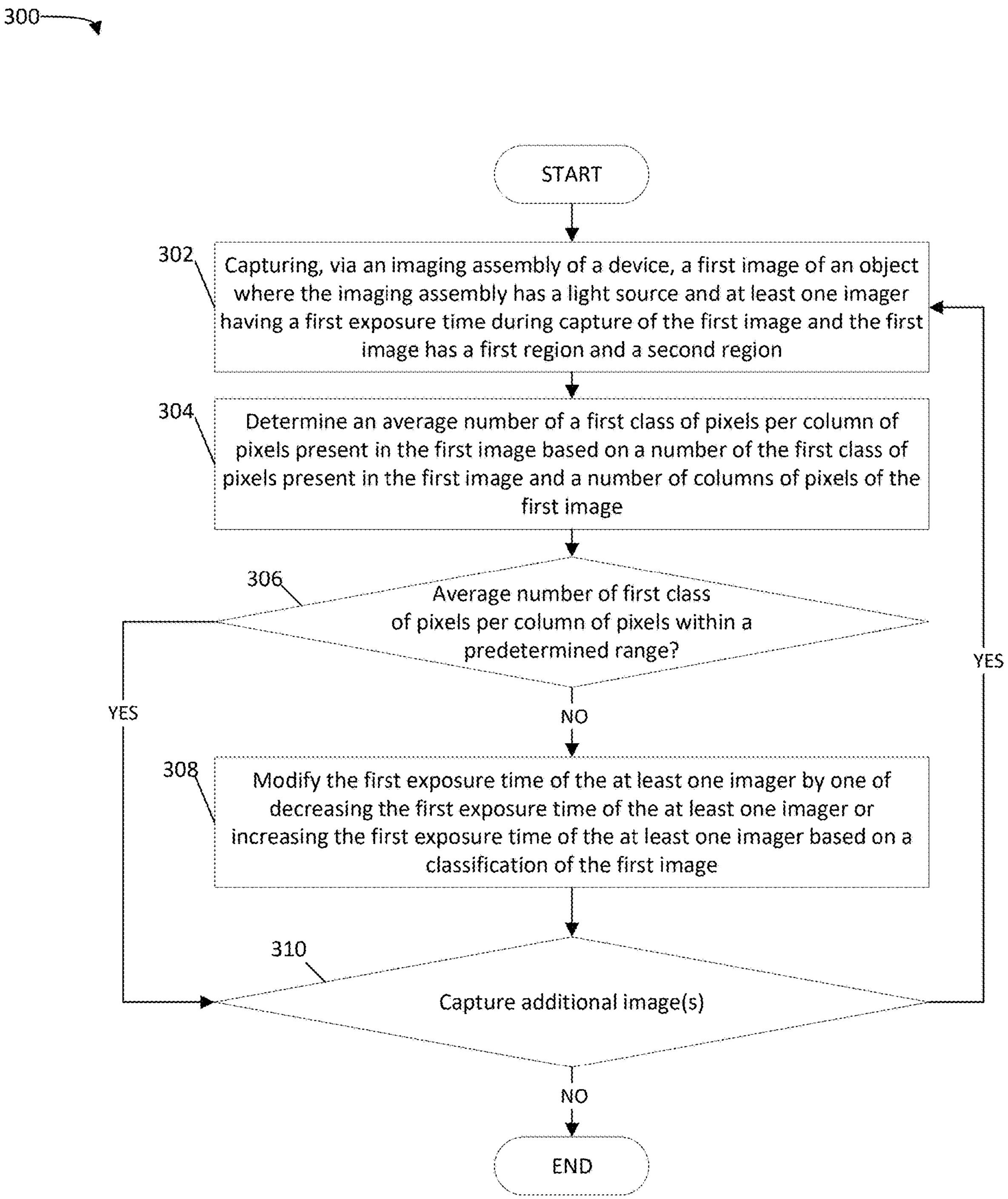

FIG. 4

METHODS AND DEVICES TO DYNAMICALLY TUNE AN EXPOSURE TIME OF AN IMAGER FOR THREE-DIMENSIONAL PROFILING OF AN OBJECT

BACKGROUND

Machine vision technologies provide a means for image-based inspection and analysis for applications ranging from automatic part inspection, process control, robotic guidance, part identification, barcode reading, and many others. Machine vision technologies rely on capturing and processing images for performing specific analysis or tasks which often require both the integrated use of imaging systems as well as processing systems. For example, machine vision technologies may capture and process images to perform three-dimensional (3D) profiling of an object (e.g., 3D measurement and/or reconstruction of the object).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 is a flowchart illustrating processing steps carried out by an embodiment of the present disclosure.

Figure 1:
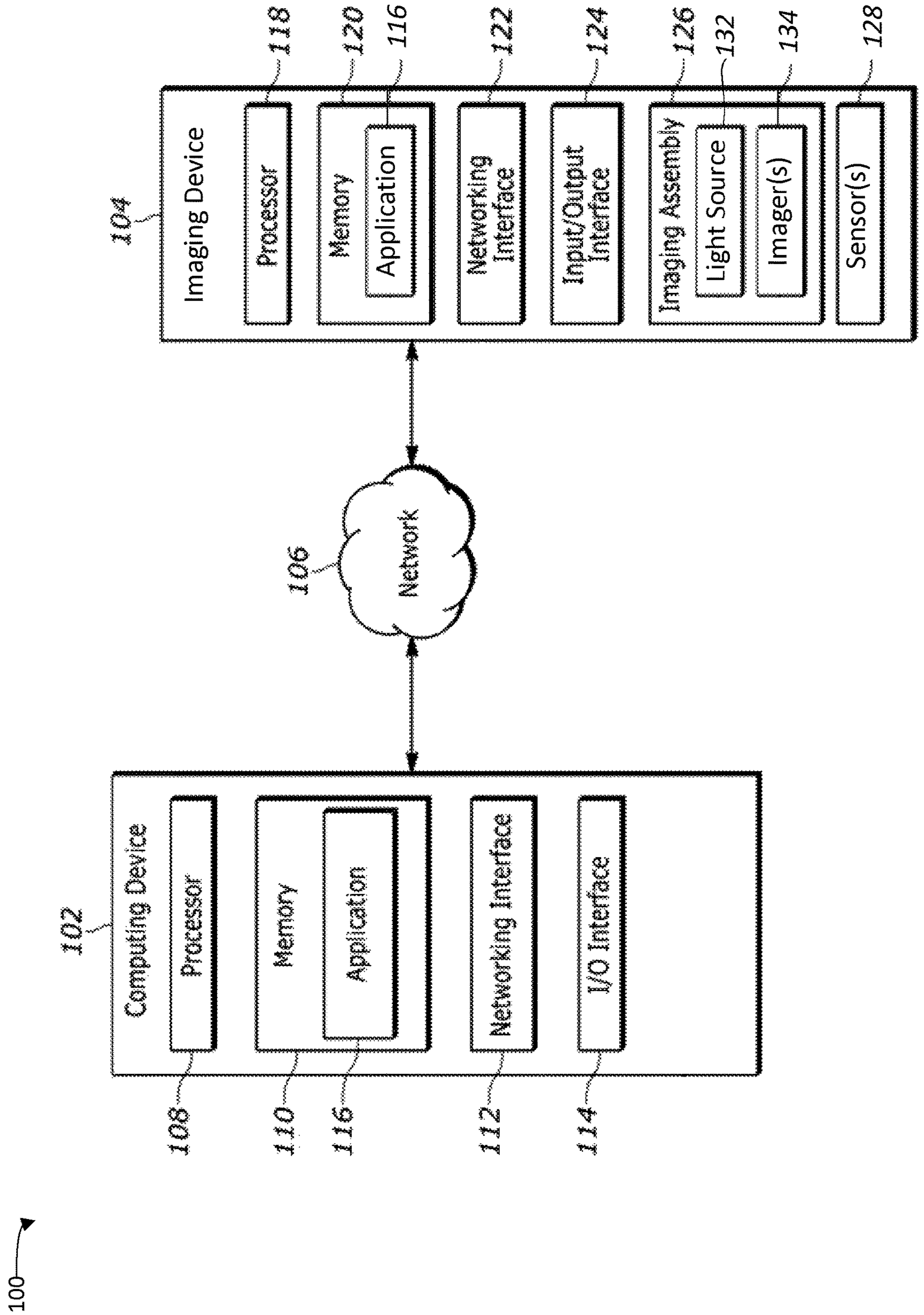
FIG. 1 is a diagram illustrating an example embodiment of a system of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

As mentioned above, machine vision technologies may capture and process images to perform three-dimensional (3D) profiling of an object (e.g., 3D measurement and/or reconstruction of the object). A 3D measurement and/or reconstruction device or system utilizes a light source to project one or more sheets of light (e.g., a laser beam, a structured light, or the like) onto an object and utilizes an imaging device (e.g., a camera, imager, or the like) to capture an image of the object illuminated by the light source. For example, the image may be a laser profile image generally comprising a bright line on a dark and nearly featureless background. The device or system detects and utilizes a position of the bright line in the captured image to determine 3D measurements of and/or reconstruct the object. An accuracy of the 3D measurements and/or reconstruction of the object depends on an exposure time of the imaging device. For example, when utilizing an appropriate exposure time of an imaging device, a position of a center of a bright line in each column of a captured image can be transformed into a 3D point in a world coordinate system. The 3D points lie on a plane defined by the sheet of light, thus creating a slice or profile of the object. Multiple profiles can be combined into a 3D point cloud of the object.

Conventional auto-exposure algorithms are incompatible with a laser profile image. For example, generally a center of the line present in a laser profile image is saturated when an exposure time of an imaging device is within a predetermined (e.g., a suitable) range and, as such, increasing an exposure time of the imaging device provides for widening the line rather than increasing a brightness of the line.

Proposed techniques to mitigate deficiencies with conventional auto-exposure algorithms include implementing conventional auto-exposure algorithms in hardware including, but not limited to, a field-programmable gate array (FPGA). However, these hardware implementations are generally constrained by size and/or power consumption which can reduce a processing efficiency of an imaging device and/or system, yield laser profile images of insufficient exposure, and reduce an efficiency and accuracy of the 3D measurement and/or reconstruction process of an object.

As such, conventional systems suffer from a general lack of versatility because these systems cannot automatically and dynamically modify an exposure time of an imaging device by one of decreasing the exposure time of the imaging device or increasing the exposure time of the imaging device based on a classification (e.g., over exposed or under exposed) of a laser profile image while utilizing fewer FPGA resources (e.g., look up tables or LUTs, Random Access Memory or RAM, or the like) to improve and enhance an efficiency and accuracy of the 3D measurement and/or reconstruction process of an object.

Overall, this lack of versatility causes conventional systems to provide underwhelming performance and reduce the efficiency and general timeliness of laser profile image processing and the 3D measurement and/or reconstruction process of an object. Thus, it is an objective of the present disclosure to eliminate these and other problems with conventional systems and methods via systems and methods that can modify an exposure time of an imaging device by one of decreasing the exposure time of the imaging device or increasing the exposure time of the imaging device based on a classification (e.g., over exposed or under exposed) of a laser profile image while utilizing fewer FPGA resources to improve and enhance an efficiency and accuracy of the 3D measurement and/or reconstruction process of an object.

In accordance with the above, and with the disclosure herein, the present disclosure includes improvements in computer functionality or improvements to other technologies at least because the present disclosure describes that, e.g., imaging devices and/or systems, and their related various components, may be improved or enhanced with the disclosed dynamic system features and methods. That is, the present disclosure describes improvements in the functioning of an imaging device and/or image processing device and/or system and/or "any other technology or technical field" (e.g., the field of image processing). For example, the disclosed dynamic system features and methods improve and enhance the 3D measurement and/or reconstruction process of an object by introducing the automatic and dynamic modification of an exposure time of an imaging device by one of decreasing the exposure time of the imaging device or increasing the exposure time of the imaging device based on a classification (e.g., over exposed or under exposed) of a laser profile image while utilizing fewer FPGA resources.

In addition, the present disclosure applies various features and functionality, as described herein, with, or by use of, a particular machine, e.g., a processor, a device, and/or other hardware components as described herein. Moreover, the present disclosure includes specific features other than what is well-understood, routine, conventional activity in the field, or adding unconventional steps that demonstrate, in various embodiments, particular useful applications, e.g., image processing protocols of an imaging device for modifying an exposure time of the imaging device by one of decreasing the exposure time of the imaging device or increasing the exposure time of the imaging device based on a classification (e.g., over exposed or under exposed) of a laser profile image while utilizing fewer FPGA resources to improve and enhance an efficiency and accuracy of the 3D measurement and/or reconstruction process of an object.

Accordingly, it would be highly beneficial to develop a system and method that can automatically and dynamically modify an exposure time of an imaging device by one of decreasing the exposure time of the imaging device or increasing the exposure time of the imaging device based on a classification (e.g., over exposed or under exposed) of a laser profile image. The systems and methods of the present disclosure address these and other needs.

In an embodiment, the present disclosure is directed to a method. The method comprises: capturing, via an imaging assembly of a device, a first image of an object where the imaging assembly has a light source and at least one imager having a first exposure time during capture of the first image, and the first image has a first region and a second region; determining an average number of a first class of pixels per column of pixels present in the first image based on a number of the first class of pixels present in the first image and a number of columns of pixels of the first image; determining whether the average number of the first class of pixels per column of pixels is within a predetermined range; responsive to determining the average number of the first class of pixels per column of pixels is not within the predetermined range, modifying the first exposure time of the at least one imager by one of decreasing the first exposure time of the at least one imager or increasing the first exposure time of the at least one imager based on a classification of the first image, wherein the first region is a line indicative of light present in the first image, the second region is indicative of a background of the first image, and the first class of pixels is indicative of pixels satisfying a brightness threshold present in the first image.

In an embodiment, the present disclosure is directed to a device comprising an imaging assembly having a light source and at least one imager; one or more processors; and a non-transitory computer-readable memory coupled to the one or more processors. The memory stores instructions thereon that, when executed by the one or more processors, cause the one or more processors to: receive a first image of an object, the first image being captured by the at least one imager utilizing a first exposure time, and the first image having a first region and a second region; determine an average number of a first class of pixels per column of pixels present in the first image based on a number of the first class of pixels present in the first image and a number of columns of pixels of the first image; determine whether the average number of the first class of pixels per column of pixels is within a predetermined range; responsive to determining the average number of the first class of pixels per column of pixels is not within the predetermined range, modifying the first exposure time of the at least one imager by one of decreasing the first exposure time of the at least one imager or increasing the first exposure time of the at least one imager based on a classification of the first image, wherein the first region is a line indicative of light present in the first image, the second region is indicative of a background of the first image, and the first class of pixels is indicative of pixels satisfying a brightness threshold present in the first image.

In an embodiment, the present disclosure is directed to a non-transitory computer-readable medium. The non-transitory computer-readable medium stores instructions thereon that, when executed by one or more processors, cause the one or more processors to: receive, via an imaging assembly of a device, a first image of an object where the imaging assembly has a light source and at least one imager having a first exposure time during capture of the first image, and the first image has a first region and a second region; determine an average number of a first class of pixels per column of pixels present in the first image based on a number of the first class of pixels present in the first image and a number of columns of pixels of the first image; determine whether the average number of the first class of pixels per column of pixels is within a predetermined range; responsive to determining the average number of the first class of pixels per column of pixels is not within the predetermined range, modifying the first exposure time of the at least one imager by one of decreasing the first exposure time of the at least one imager or increasing the first exposure time of the at least one imager based on a classification of the first image, wherein the first region is a line indicative of light present in the first image, the second region is indicative of a background of the first image, and the first class of pixels is indicative of pixels satisfying a brightness threshold present in the first image.

Turning to the Drawings, FIG. 1 is a diagram illustrating an example embodiment of a system 100 of the present disclosure. In the example embodiment of FIG. 1, the imaging system 100 includes a computing device 102 and an imaging device 104 communicatively coupled to the computing device 102 via a network 106. Generally speaking, the computing device 102 and/or the imaging device 104 may be capable of executing instructions to, for example, implement operations of the example methods described herein, as may be represented by the flowcharts of the drawings that accompany this description. The computing device 102 is generally configured to enable a user/operator to create a machine vision job, such as a 3D measurement and/or reconstruction job, for execution on the imaging device 104. When created, the user/operator may then transmit/upload the machine vision job to the imaging device 104 via the network 106, where the machine vision job is then interpreted and executed. The computing device 102 may comprise one or more operator workstations, and may include one or more processors 108, one or more memories 110, a networking interface 112, an input/output (I/O) interface 114, a display 115, and an imaging application 116 (also referred to simply as the application 116).

The imaging device 104 is connected to the computing device 102 via a network 106, and is configured to interpret and execute machine vision jobs and/or various 3D measurement and/or reconstruction jobs, received from the computing device 102. The imaging device 104 may be 3D profile sensor or a 3D profiler. For example, the imaging device 104 may be a Zebra® Altiz 3D profile sensor. A machine vision job may be 3D profiling for generating a 3D representation (e.g., a point cloud) of an object. In 3D profiling, one or more imager(s) or image sensors view a line of light (e.g., laser light) projected onto an object where the light bends to follow a contour of the object to yield a profile that can be utilized to compute a depth or height along a width (e.g., thickness) of the line of light. Generally, the imaging device 104 may obtain a job file containing one or more job scripts from the computing device 102 via the network 106 that may define the machine vision job and may configure the imaging device 104 to capture and/or analyze images in accordance with the machine vision job. For example, the imaging device 104 may include flash memory used for determining, storing, or otherwise processing imaging data/datasets and/or post-imaging data. The imaging device 104 may then receive, recognize, and/or otherwise interpret a trigger that causes the imaging device 104 to capture an image of an object in accordance with the configuration established via the one or more job scripts. Once captured and/or analyzed, the imaging device 104 may transmit the images and any associated data via the network 106 to the computing device 102 for further analysis and/or storage. Alternatively, the imaging device 104 may further analyze or store captured and/or analyzed images and any associated data. In various embodiments, the imaging device 104 may be a "smart" camera and/or may otherwise be configured to automatically perform sufficient functionality of the imaging device 104 in order to obtain, interpret, and execute job scripts that define machine vision jobs, such as any one or more job scripts contained in one or more job files as obtained, for example, from the computing device 102.

Broadly, the job file may be a JSON representation/data format of the one or more job scripts transferrable from the computing device 102 to the imaging device 104. The job file may further be loadable/readable by a C++ runtime engine, or other suitable runtime engine, executing on the imaging device 104. Moreover, the imaging device 104 may run a server (not shown) configured to listen for and receive job files across the network 106 from the computing device 102. Additionally or alternatively, the server configured to listen for and receive job files may be implemented as one or more cloud-based servers, such as a cloud-based computing platform. For example, the server may be any one or more cloud-based platform(s) such as MICROSOFT AZURE, AMAZON AWS, or the like.

In any event, the imaging device 104 may include one or more processors 118, one or more memories 120 having the application 116, a networking interface 122, an I/O interface 124, an imaging assembly 126 having a light source 132 (e.g., a laser) and imager(s) 134, and sensor(s) 128.

The imaging assembly 126 may include a light source 132 (e.g., a laser) for projecting laser light onto an object and imager(s) 134 (e.g., a digital camera, image sensors, and/or digital video camera) for capturing or taking digital images and/or frames. Each digital image may comprise pixel data, vector information, or other image data that may be analyzed by one or more tools each configured to perform an image analysis task. In an embodiment, the imaging assembly 126 may have a dual-imager 134 (e.g., dual-camera) single light source 132 (e.g., laser) design where the dual-imagers 134 operate either synchronously or in alteration. In this way, the embodiment allows for reducing imaging gaps generally encountered at critical surface junctures due to optical occlusions and generates 3D data (e.g., profiles, depth maps, and/or point clouds) by combining or selecting pixel data of the captured digital images and/or frames.

The digital camera, image sensors, and/or digital video camera of, e.g., the imaging assembly 126 may be configured, as disclosed herein, to take, capture, obtain, or otherwise generate digital images and, at least in some embodiments, may store such images in a memory (e.g., one or more memories 110, 120) of a respective device (e.g., the computing device 102 and/or the imaging device 104).

For example, the imaging assembly 126 may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly may additionally include a 3D camera (not shown) for capturing, sensing, or scanning 3D image data. The 3D camera may include an Infra-Red (IR) projector and a related IR camera for capturing, sensing, or scanning 3D image data/datasets. A 3D camera of the imaging assembly 126 may include one or more of a time-of-flight camera, a stereo vision camera, a structured light camera, a range camera, a 3D profile sensor, or a triangulation 3D imager. In any embodiments, the imaging assembly 126 may include a camera capable of capturing color information of a field of view (FOV) of the camera. In some embodiments, the photo-realistic camera of the imaging assembly 126 may capture 2D images, and related 2D image data, at the same or similar point in time as the 3D camera of the imaging assembly 126 such that the imaging device 104 can have both sets of 3D image data and 2D image data available for a particular surface, object, area, or scene at the same or similar instance in time. In various embodiments, the imaging assembly 126 may include the 3D camera and the photo-realistic camera as a single imaging apparatus configured to capture 3D depth image data simultaneously with 2D image data. As such, the captured 2D images and the corresponding 2D image data may be depth-aligned with the 3D images and 3D image data. In examples, a 3D image may include a point cloud or 3D point cloud. As such, as used herein, the terms 3D image and point cloud or 3D point cloud may be understood to be interchangeable.

In embodiments, the imaging assembly 126 may be configured to capture images of surfaces or areas of a predefined search space or objects within the predefined search space. For example, each tool included in a job script may additionally include a region of interest (ROI) corresponding to a specific region or an object imaged by the imaging assembly 126. The ROI may be a predefined ROI, or the ROI may be determined through analysis of the image by the processor 118. Further, a plurality of ROIs may be predefined or determined through image processing. The composite area defined by the ROIs for all tools included in a particular job script may thereby define the predefined search space which the imaging assembly 126 may capture to facilitate the execution of the job script. However, the predefined search space may be user-specified to include a FOV featuring more or less than the composite area defined by the ROIs of all tools included in the particular job script. It should be noted that the imaging assembly 126 may capture 2D and/or 3D image data/datasets of a variety of areas, such that additional areas in addition to the predefined search spaces are contemplated herein. Moreover, in various embodiments, the imaging assembly 126 may be configured to capture other sets of image data in addition to the 2D/3D image data, such as grayscale image data or amplitude image data, each of which may be depth-aligned with the 2D/3D image data. Further, one or more ROIs may be within a FOV of the imaging system such that any region of the FOV of the imaging system may be a ROI.

The imaging device 104 may also process the 2D image data/datasets and/or 3D image datasets for use by other devices (e.g., the computing device 102, an external server). For example, the one or more processors 118 may process the image data or datasets captured, scanned, or sensed by the imaging assembly 126. The processing of the image data may generate post-imaging data that may include metadata, simplified data, normalized data, result data, status data, or alert data as determined from the original scanned or sensed image data. The image data and/or the post-imaging data may be transmitted to the computing device 102 executing the imaging application 116 for viewing, manipulation, and/or otherwise interaction. In other embodiments, the image data and/or the post-imaging data may be transmitted to a server for storage or for further manipulation. As described herein, the computing device 102, imaging device 104, and/or external server or other centralized processing unit and/or storage may store such image data, and may also transmit the image data and/or the post-imaging data to another application implemented on a user device, such as a mobile device, a tablet, a handheld device, or a desktop device.

Each of the one or more memories 110, 120 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., imaging application 116 or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108, 118 (e.g., working in connection with the respective operating system in the one or more memories 110, 120) to facilitate, implement, or perform the machine readable instructions, methods, processes, elements or limitations, as illustrated, depicted, or described for the various flowcharts, illustrations, diagrams, figures, and/or other disclosure herein.

The application 116, when executed by the one or more processors 108, 118, configures the one or more processors 108, 118 to perform various functions described below in greater detail and related to automatically and dynamically modifying an exposure time of an imaging device 104 by one of decreasing the exposure time of the imaging device 104 or increasing the exposure time of the imaging device 104 based on a classification (e.g., over exposed or under exposed) of a captured image of an object to improve and enhance an efficiency and accuracy of a 3D measurement and/or reconstruction process of the object. For example, the application 116, when executed by the one or more processors 108, 118, configures the one or more processors 108, 118 to: receive a first image of an object, the first image being captured by at least one imager 134 utilizing a first exposure time, and the first image having a first region and a second region; determine an average number of a first class of pixels per column of pixels present in the first image based on a number of the first class of pixels present in the first image and a number of columns of pixels of the first image; determine whether the average number of the first class of pixels per column of pixels is within a predetermined range; responsive to determining the average number of the first class of pixels per column of pixels is not within the predetermined range, modifying the first exposure time of the at least one imager 134 by one of decreasing the first exposure time of the at least one imager 134 or increasing the first exposure time of the at least one imager 134 based on a classification of the first image, wherein the first region is a line indicative of light present in the first image, the second region is indicative of a background of the first image, and the first class of pixels is indicative of pixels satisfying a brightness threshold present in the first image.

In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.). The application 116 may also be implemented as a suite of distinct applications in other examples. Those skilled in the art will appreciate that the functionality implemented by the one or more processors 108, 118 via the execution of the application 116 may also be implemented by one or more specially designed hardware and firmware components, such as field-programmable gate arrays (FPGAs), application-specific integrated circuits (ASICs) and the like in other embodiments.

The one or more memories 110, 120 may store an operating system (OS) (e.g., Microsoft Windows, Linux, Unix, etc.) capable of facilitating the functionalities, apps, methods, or other software as discussed herein. The one or more memories 110 may also store the application 116, which may be configured to enable machine vision job construction, as described further herein. Additionally, or alternatively, the imaging application 116 may also be stored in the one or more memories 120 of the imaging device 104, and/or in an external database (not shown), which is accessible or otherwise communicatively coupled to the computing device 102 via the network 106. The one or more memories 110, 120 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision based imaging application, such as the imaging application 116, where each may be configured to facilitate their various functionalities discussed herein. It should be appreciated that one or more other applications may be envisioned and that are executed by the one or more processors.

The one or more processors 108, 118 may be connected to the one or more memories 110, 120 via a computer bus responsible for transmitting electronic data, data packets, or otherwise electronic signals to and from the one or more processors 108, 118 and one or more memories 110, 120 to implement or perform the machine readable instructions, methods, processes, elements or limitations, as illustrated, depicted, or described for the various flowcharts, illustrations, diagrams, figures, and/or other disclosure herein.

The one or more processors 108, 118 may interface with the one or more memories 110, 120 via the computer bus to execute the operating system (OS). The one or more processors 108, 118 may also interface with the one or more memories 110, 120 via the computer bus to create, read, update, delete, or otherwise access or interact with the data stored in the one or more memories 110, 120 and/or external databases (e.g., a relational database, such as Oracle, DB2, MySQL, or a NoSQL based database, such as MongoDB). The data stored in the one or more memories 110, 120 and/or an external database may include all or part of any of the data or information described herein, including, for example, machine vision job images (e.g., images captured by the imaging device 104 in response to execution of a job script) and/or other suitable information.

The networking interfaces 112, 122 may be configured to communicate (e.g., transmit and receive) data via one or more external/network port(s) to one or more networks or local terminals, such as network 106, described herein. In some embodiments, networking interfaces 112, 122 may include a client-server platform technology such as ASP.NET, Java J2EE, Ruby on Rails, Node.js, a web service or online API, responsive for receiving and responding to electronic requests. The networking interfaces 112, 122 may implement the client-server platform technology that may interact, via the computer bus, with the one or more memories 110, 120 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 112, 122 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 106. In some embodiments, network 106 may comprise a private network or local area network (LAN) utilizing Gigabit Ethernet. Additionally or alternatively, network 106 may comprise a public network such as the Internet. In some embodiments, the network 106 may comprise routers, wireless switches, or other such wireless connection points communicating to the computing device 102 (via the networking interface 112) and the imaging device 104 (via networking interface 122) via wireless communications based on any one or more of various wireless standards, including by non-limiting example, IEEE 802.11a/b/c/g (WIFI), the BLUETOOTH® standard, or the like.

The I/O interfaces 114, 124 may include or implement operator interfaces configured to present information to an administrator or operator and/or receive inputs from the administrator or operator. An operator interface may provide a display screen (e.g., via the user computing device 102 and/or imaging device 104) which a user/operator may use to visualize any images, graphics, text, data, features, pixels, objects, surfaces, and/or other suitable visualizations or information. For example, the computing device 102 and/or imaging device 104 may comprise, implement, have access to, render, or otherwise expose, at least in part, a graphical user interface (GUI) for displaying images, graphics, text, data, features, pixels, and/or other suitable visualizations or information on the display screen. In an embodiment, the computing device 102 and/or imaging device 104 may utilize the Zebra Aurora Imaging Library™ and/or the Zebra Auora Design Assistant™. In another embodiment, the computing device 102 and/or imaging device 104 may utilize vision software that implements support for the GigE Vision standard, GenICam GenDC specification, and GenICam PFNC 3D pixel formats.

The I/O interfaces 114, 124 may also include I/O components (e.g., connectors, ports, capacitive or resistive touch sensitive input panels, keys, buttons, lights, LEDs indicating one or more of a status of power, light source, or network speed, any number of keyboards, mice, USB drives, optical drives, screens, touchscreens, etc.), which may be directly/indirectly accessible via or attached to the computing device 102 and/or the imaging device 104. In an embodiment, the imaging device 104 may utilize connectors including, but not limited to, M12-X 8-pin connectors for network interface and power input or M12-A 12 pin connectors for digital I/Os and alternate power input. In an embodiment, the imaging device 104 may utilize digital I/Os including, but not limited to, 24 volt (V) isolated inputs or 24 V isolated outputs (e.g., having a 5 KHz maximum). According to some embodiments, an administrator or user/operator may access the computing device 102 and/or imaging device 104 to construct jobs, review images or other information, make changes, input responses and/or selections, and/or perform other functions.

The sensor(s) 128 can include any one of, or any suitable combination of, sensors. For example, the sensor(s) 128 can comprise an inertial navigation system including one or more of an accelerometer, a gyroscope, a magnetometer, an altimeter, or a proximity sensor. In this way, the sensor(s) 128 in conjunction with one or more other components (e.g., the imaging assembly 126) of the imaging device 104 provide for determining a position and orientation of the imaging device 104. Additionally, a proximity sensor (e.g., an object detection sensor, trigger, or mechanism) provides for automatically and efficiently commencing and ceasing imaging (e.g., a single profile scan, a fixed-length scan (frame start), or a variable-length scan (frame active)) of an object. In an embodiment, the proximity sensor can be one or more of, or any suitable combination of, a quadrature encoder with A/B channels, an external input trigger, an internal object detection trigger, internal timers, counters, and/or logic blocks, or an external software trigger.

As described above herein, in some embodiments, the computing device 102 may perform the functionalities as discussed herein as part of a "cloud" network or may otherwise communicate with other hardware or software components within the cloud to send, retrieve, or otherwise analyze data or information described herein.

Figure 2A:
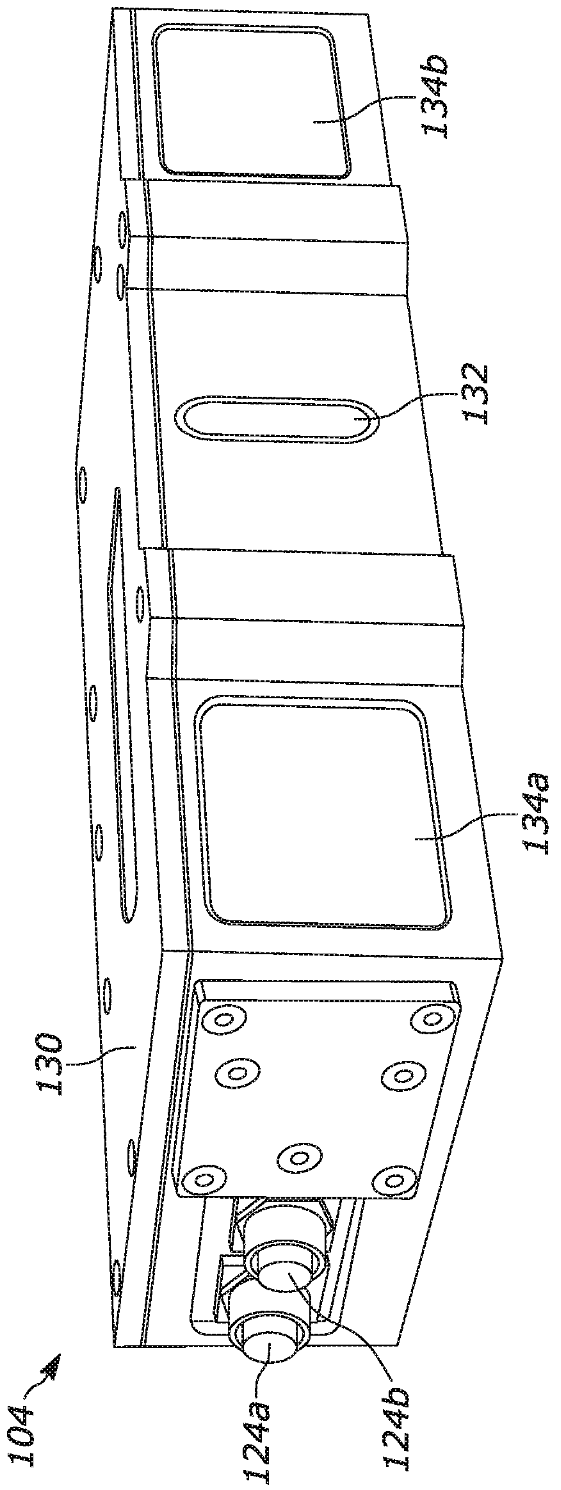
FIGS. 2A-B are diagrams illustrating an embodiment of a device of the present disclosure.
Figure 2B:
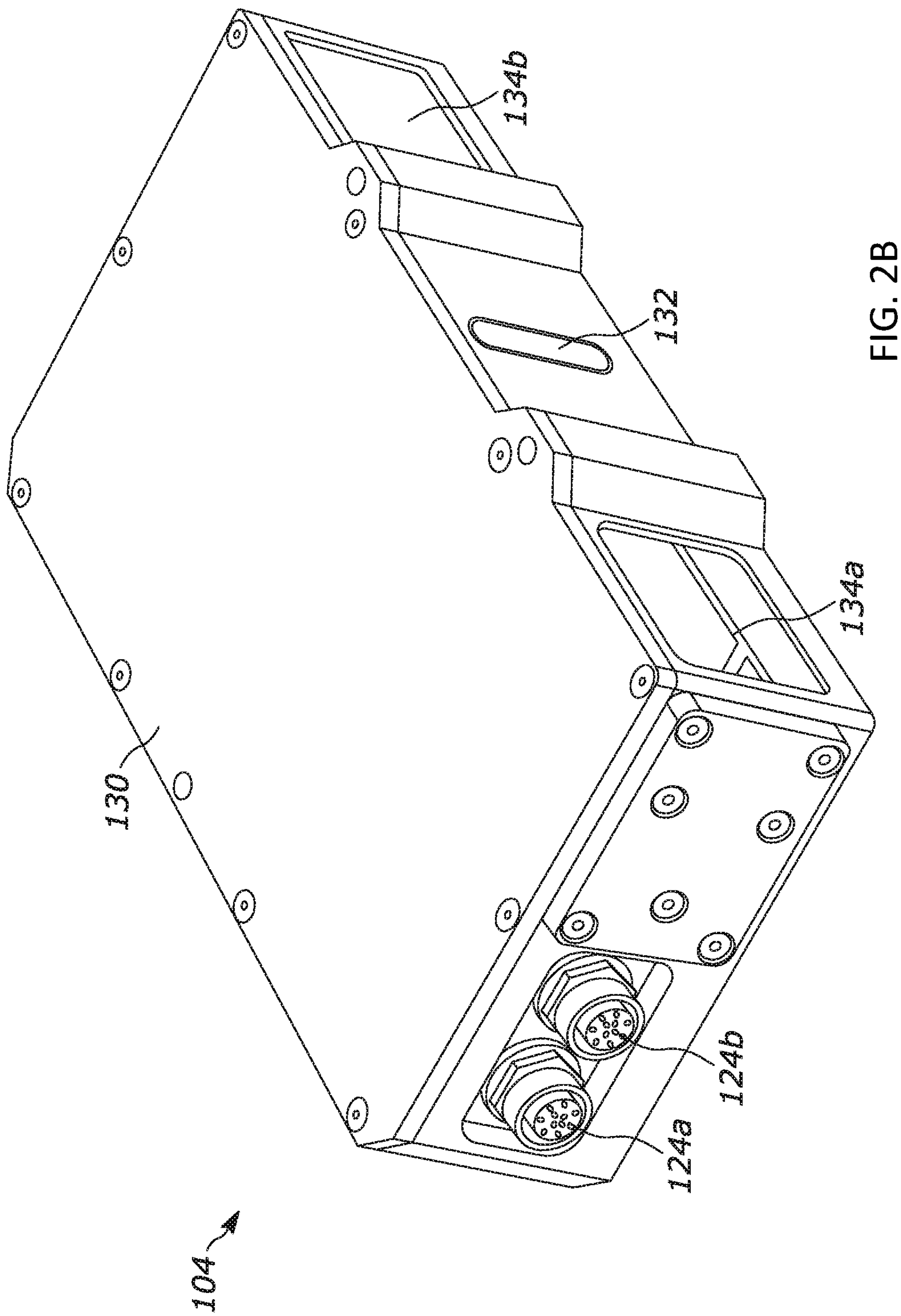

FIGS. 2A-B are diagrams illustrating an embodiment of a device 104 of the present disclosure. FIGS. 2A and 2B are perspective views of an example imaging device 104 that may be implemented in the imaging system of FIG. 1, in accordance with embodiments described herein. The imaging device 104 includes a housing 132, I/O ports 124*a* and 124*b*, a light source 132 (e.g., a laser) and imagers 134*a* and 134*b*. The housing may be a solid IP67-rated aluminum housing for harsh environments. The light source 132 and imagers 134*a* and 134*b* provide for imaging scenes with profiling rates that allow for reducing imaging gaps generally encountered at critical surface junctures due to optical occlusions.

As previously mentioned, the imaging device 104 may obtain job files from a computing device (e.g., user computing device 102) which the imaging device 104 thereafter interprets and executes. The instructions included in the job file may include device configuration settings (also referenced herein as "imaging settings") operable to adjust the configuration of the imaging device 104 prior to capturing images of an object.

For example, the device configuration settings may include instructions to adjust one or more settings (e.g., an exposure time) related to the imagers 134*a* and 134*b*. As an example, assume that at least a portion of the intended analysis corresponding to a machine vision job requires the imaging device 104 to modify an exposure of a captured image. To accommodate this requirement, the job file may include device configuration settings to increase or decrease an exposure time of the imagers 134*a* and 134*b* based on a classification (e.g., over exposed or under exposed) of a captured image. The imaging device 104 may interpret these instructions (e.g., via one or more processors 118) and accordingly increase or decrease an exposure time of the imagers 134*a* and 134*b*. Thus, the imaging device 104 may be configured to automatically adjust its own configuration to optimally conform to a particular machine vision job.

The imaging device 104 may include one or more attachment point(s) or mounting point(s) (not shown) to enable a user to connect and/or removably affix the imaging device 104 to a mounting device (e.g., imaging tripod, camera mount, etc.), a structural surface (e.g., a warehouse wall, a warehouse ceiling, scanning bed or table, structural support beam, etc.), other accessory items (e.g., a robotic arm), and/or any other suitable connecting devices, structures, or surfaces. For example, the imaging device 104 may be optimally placed on a mounting device in a distribution center, manufacturing plant, warehouse, and/or other facility to image and thereby monitor the quality/consistency of products, packages, and/or other items as they pass through a field of view (FOV) of the imaging device 104. Moreover, the mounting point(s) may enable a user to connect the imaging device 104 to a myriad of accessory items including, but without limitation, one or more external illumination devices, one or more mounting devices/brackets, and the like. In an embodiment, the one or more attachment point(s) or mounting point(s) may accept M4-threaded screws and the imaging device 104 may include through hole guides allow for the seamless installation and the alignment of additional imaging devices 104.

In addition, the imaging device 104 may include several hardware components contained within the housing 132 that enable connectivity to a computer network (e.g., network 106). For example, the imaging device 104 may include a networking interface (e.g., networking interface 122) that enables the imaging device 104 to connect to a network, such as a Gigabit Ethernet connection and/or a Dual Gigabit Ethernet connection. Further, the imaging device 104 may include transceivers and/or other communication components as part of the networking interface to communicate with other devices (e.g., the user computing device 102) via, for example, Power-over Ethernet (PoE), Ethernet/IP, PROFINET, Modbus TCP, CC-Link, USB 3.0, RS-232, and/or any other suitable communication protocol or combinations thereof.

Figure 3:
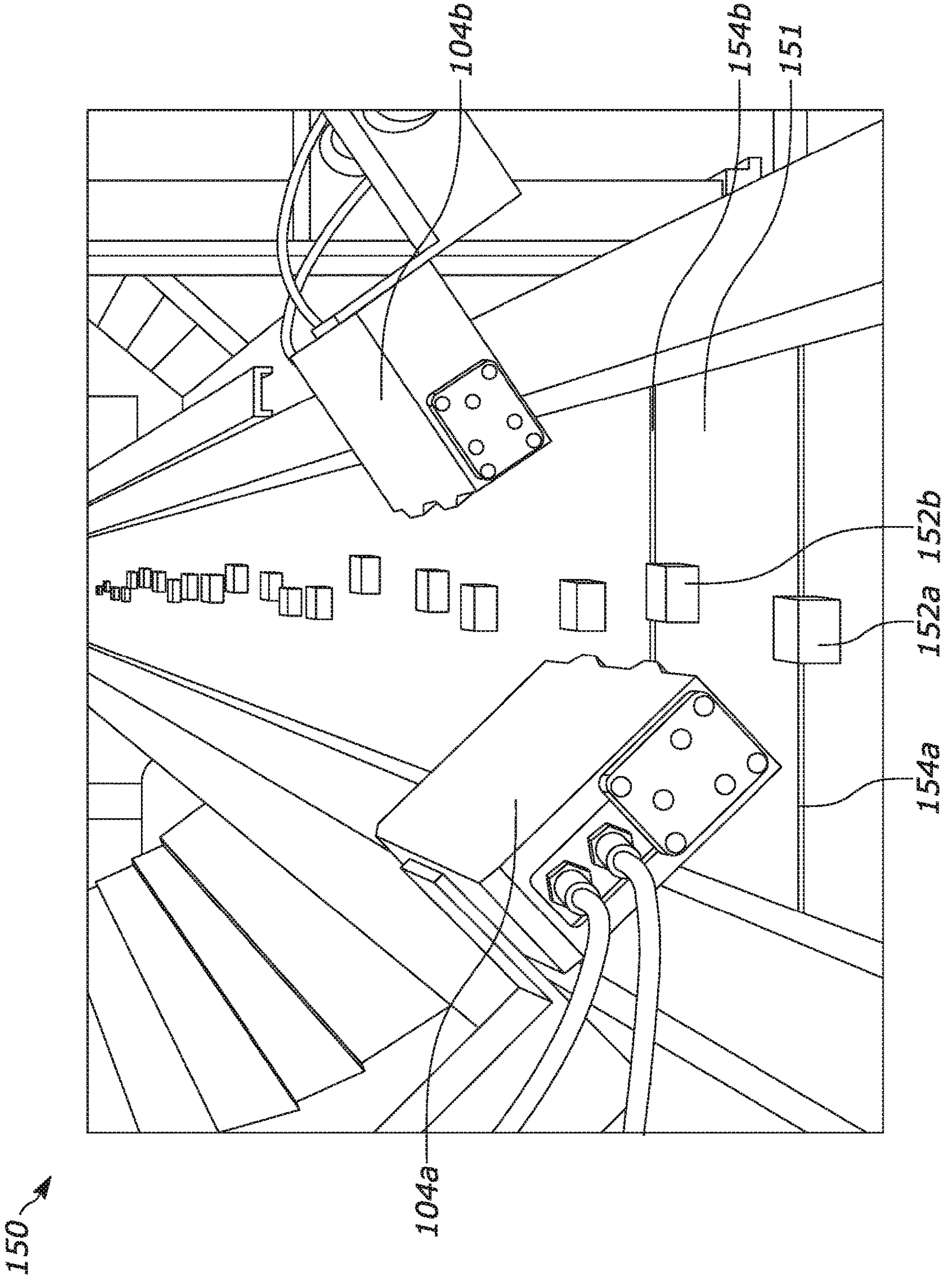
FIG. 3 is a diagram illustrating an example environment for implementing the device of FIGS. 2A-B.

FIG. 3 is a diagram illustrating an example environment 150 for implementing the imaging device 104 of FIGS. 2A and 2B. In the environment 300 of FIG. 3, imaging devices 104*a* and 104*b* (also collectively referred to as the imaging devices 104) are positioned above a scanning surface 151. The imaging devices 104*a* and 104*b* are disposed and oriented such that FOVs (not shown) of the imaging devices 104*a* and 104*b* include at least a portion of the scanning surface 151. The scanning surface 151 may be a table, podium, mount for mounting an object or part, a conveyer, a cubby hole, or another mount or surface that may support a part or object to be scanned. As illustrated, the scanning surface 151 is a conveyer belt having a plurality of objects 152 (e.g., objects 152*a* and 152*b*) thereon where the object 152*a* is within a FOV of the imaging device 104*a* and the object 152*b* is within the FOV of the imaging device 104*b*. As the object 152*a* passes within the FOV of the imaging device 104*a*, the imaging device 104*a* projects laser light 154*a* onto the object 152*a* while the imager(s) 134 (as shown in FIGS. 2A and 2B) of the imaging device 104*a* capture one or more images of the object 152*a*. Additionally, as the object 152*b* passes within the FOV of the imaging device 104*b*, the imaging device 104*b* projects laser light 154*b* onto the object 152*b* while the imagers(s) 134 (as shown in FIGS. 2A and 2B) of the imaging device 104*b* capture one or more images of the object 152*b*.

As mentioned above, the imaging devices 104 may each be 3D profile sensor or a 3D profiler. For example, the imaging devices 104 may be a Zebra® Altiz 3D profile sensor. The imaging devices 104 may execute a machine vision job including, but not limited to, 3D profiling for generating a 3D representation (e.g., a point cloud) of an object. In 3D profiling, one or more imager(s) or image sensors view a line of light (e.g., laser light) projected onto an object where the light bends to follow a contour of the object to yield a profile that can be utilized to compute a depth or height along a width (e.g., thickness) of the line of light. The imaging devices 104*a* and 104*b* may respectively determine one or more profiles of the objects 152*a* and 152*b* and combine the respective one or more profiles to generate a point cloud of the objects 152*a* and 152*b*. Additionally, in an embodiment, the imaging devices 104*a* and 104*b*, and associated system, may identify, from 3D information from a 3D image or point cloud, a surface of the object 152*a* and/or 152*b*. The imaging devices 104*a* and 104*b*, and associated processors and system, may then match the identified surface of the object 152*a* and/or 152*b* with a model surface to perform surface matching.

The imaging devices 104*a* and 104*b* may be mounted above the objects 152 on a ceiling, a beam, a metal tripod, or another object for supporting the position of the imaging devices 104*a* and 104*b* for capturing images of the objects 152 on the scanning surface 151. Further, the imaging devices 104*a* and 104*b* may alternatively be mounted on a wall or another mount that faces objects 152 on the scanning surface 151 from a horizontal direction. In examples, the imaging device 104 may be mounted on any apparatus or surface for imaging and scanning objects 152 that are in, or pass through, the FOV of the imaging device 104.

As mentioned above, the embodiments of the present disclosure may provide for more robust machine vision applications including, but not limited to, 3D measurement and/or reconstruction of an object in real-time. By automatically and dynamically modifying an exposure time of imager(s) 134 of an imaging device 104 by one of decreasing the exposure time of the imager(s) 134 or increasing the exposure time of the imager(s) 134 based on a classification (e.g., over exposed or under exposed) of an image, the described systems and methods improve and enhance an efficiency and accuracy of the 3D measurement and/or reconstruction process of an object 152. The disclosed embodiments may further provide benefits as to reduce human analysis and input during automated processes, increase surface matching efficiency, increase object identification efficiency and accuracy, and increase the versatility, machine vision process efficiency, and robustness of a machine vision system.

FIG. 4 is a flowchart illustrating processing steps carried out by an embodiment of the present disclosure. The processing steps will be described in conjunction with their performance in the system (e.g., by the imaging device 104 or the computing device 102 in conjunction with the imaging device 104). In general, via performance of the processing steps, the system can automatically and dynamically modify an exposure time of an imaging device 104 by one of decreasing the exposure time of the imaging device 104 or increasing the exposure time of the imaging device 104 based on a classification (e.g., over exposed or under exposed) of an image. For example, the system can receive a first image of an object, the first image being captured by at least one imager utilizing a first exposure time, and the first image having a first region and a second region; determine an average number of a first class of pixels per column of pixels present in the first image based on a number of the first class of pixels present in the first image and a number of columns of pixels of the first image; determine whether the average number of the first class of pixels per column of pixels is within a predetermined range; responsive to determining the average number of the first class of pixels per column of pixels is not within the predetermined range, modifying the first exposure time of the at least one imager by one of decreasing the first exposure time of the at least one imager or increasing the first exposure time of the at least one imager based on a classification of the first image, wherein the first region is a line indicative of light present in the first image, the second region is indicative of a background of the first image, and the first class of pixels is indicative of pixels satisfying a brightness threshold present in the first image.

Beginning in step 302, the system captures, via an imaging assembly 126 of a device 104, a first image of an object 152 where the imaging assembly 126 has a light source 132 and at least one imager 134 having a first exposure time during capture of the first image. The imaging assembly 126 may be configured to capture an image utilizing the at least one imager 134 based on various scan types (e.g., a single-profile scan, a fixed-length scan (frame start), a variable-length scan (frame active), or the like). The device 104 may be a 3D profile sensor or a 3D profiler. The light source 132 may be a laser where the laser provides red light having a wavelength of 660 nanometers (nm), blue light having a wavelength of 405 nm, or any suitable color light and wavelength. The imaging assembly may project light (e.g., laser light), via the light source 132, onto the object 152 during capture of the first image. The first image may have a first region and a second region where the first region is a line indicative of light present in the first image and the second region is indicative of a background of the first image. For example, the first image may be a laser profile image where the first region is a line indicative of laser light present in the first image and the second region is indicative of a background of the first image. In an embodiment, a user may define a region of interest (ROI) of the first region. As described in further detail below, the first region may include various classes of pixels (e.g., a first class, a second class, a third class, and so on) satisfying different brightness thresholds present in the first image.

Figure 5:
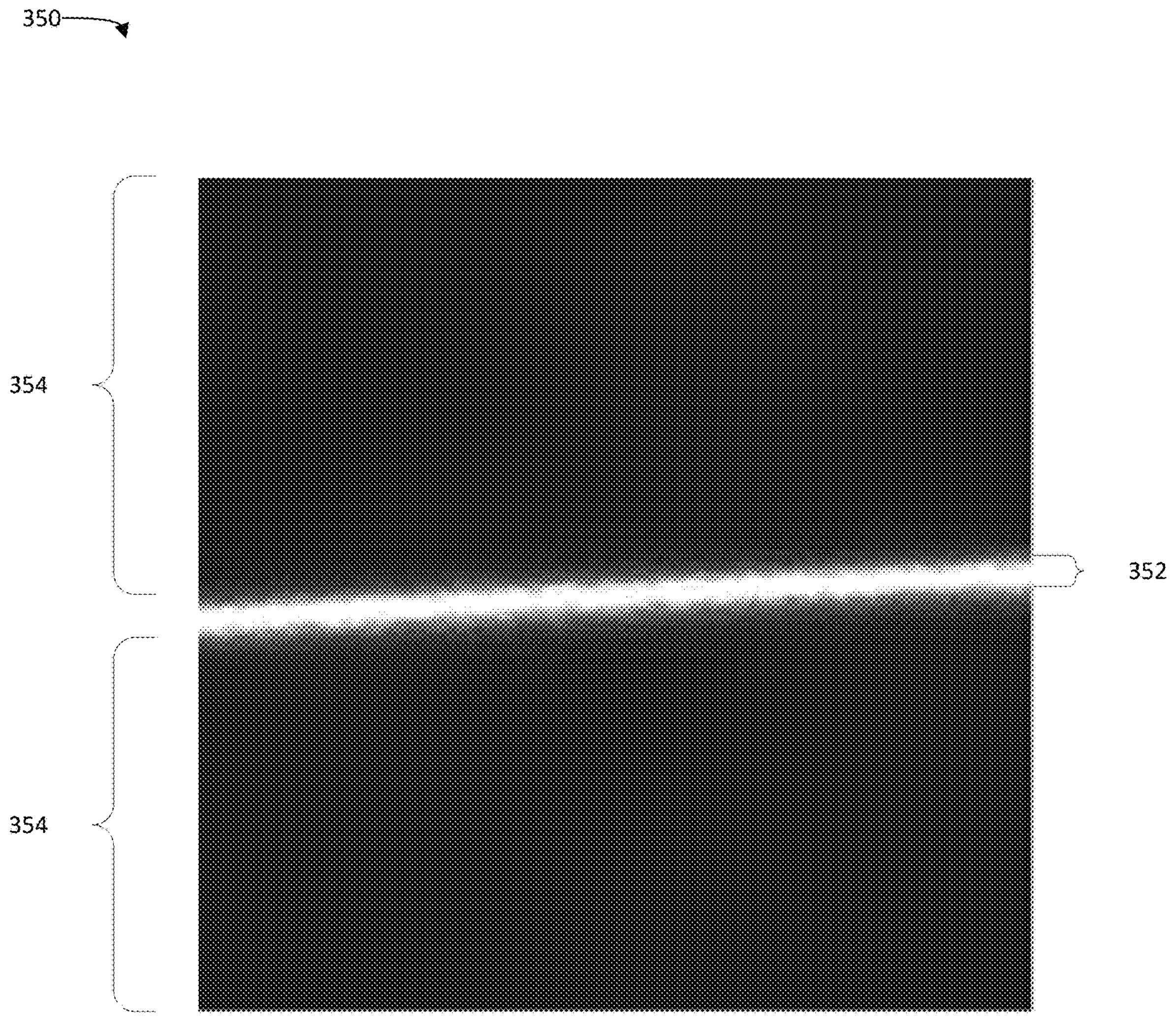
FIG. 5 is a diagram illustrating an example image captured by the device of FIGS. 2A-B.

FIG. 5 is a diagram illustrating an example image 350 captured by the device 104 of FIGS. 2A-B. As shown in FIG. 5, the image 350 has a first region 352 and second regions 354. The first region 352 is a line indicative of light present in the first image and the second region is indicative of a background of the first image where the background is dark and nearly featureless.

Referring back to FIG. 4, in step 304, the system determines an average number of a first class of pixels per column of pixels present in the first image based on a number of the first class of pixels present in the first image and a number of columns of pixels of the first image. The first class of pixels is indicative of pixels satisfying a brightness threshold present in the first image. The average number of the first class of pixels per column of pixels is one of a floating point or a fixed-point value. Columns where the first region (e.g., the line) is absent (e.g., due to occlusion) may be disregarded. In an appropriately exposed image, the average number of the first class of pixels per column of pixels should lie within a predetermined range. The predetermined range is indicative of a target range of the average number of the first class of pixels per column of pixels comprising the first region (e.g., a thickness of the line). In step 306, the system determines whether the average number of the first class of pixels per column of pixels is within the predetermined range. The predetermined range can be set by the system or user and can include any suitable range (e.g., 2.5-4.0 pixels) indicative of an appropriately exposed image. As described in further detail below, the system modifies the first exposure time of the imager(s) 134 if the average number of the first class of pixels per column of pixels is not within the predetermined range.

Figure 6A:
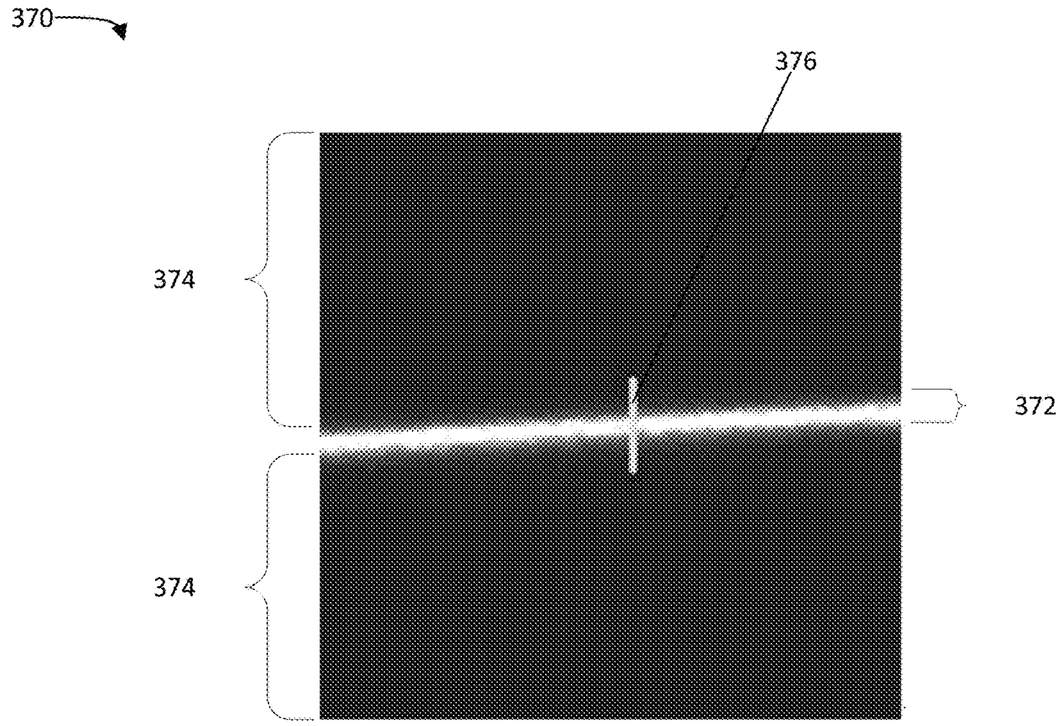
FIG. 6A is a diagram illustrating an example image captured by the device of FIGS. 2A-B.
Figure 6B:
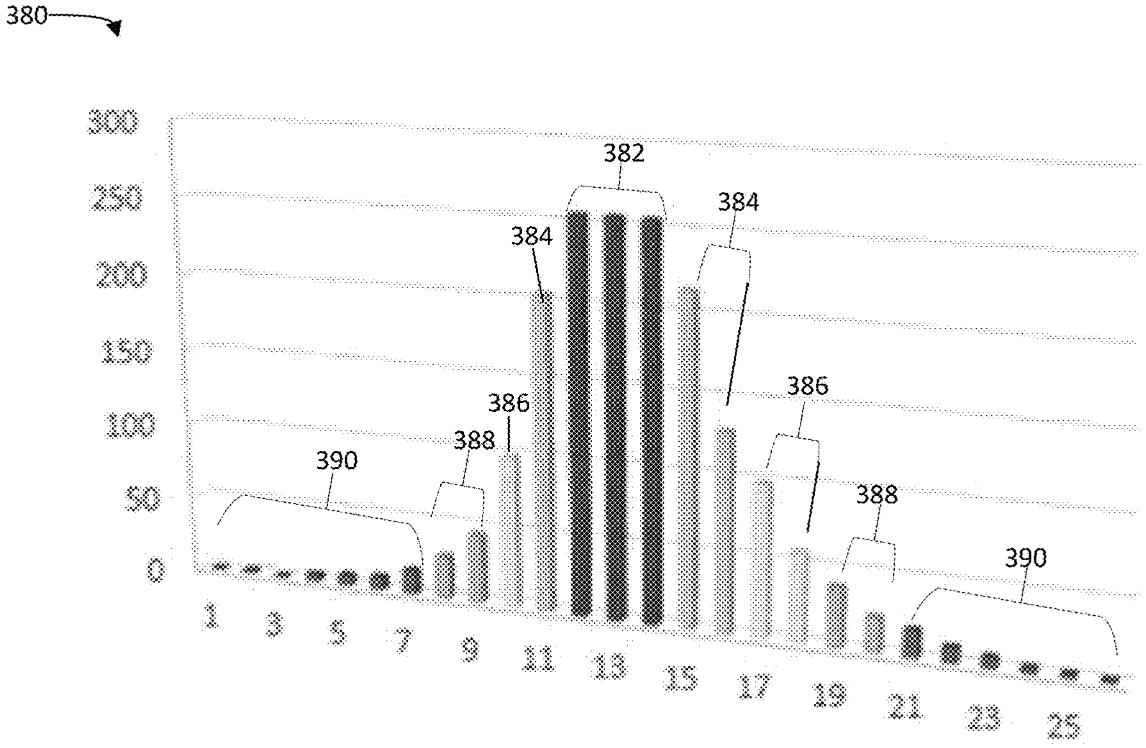
FIG. 6B is a diagram illustrating a graph of the example image of FIG. 6A.

FIG. 6A is a diagram illustrating an example image 370 captured by the device 104 of FIGS. 2A-B and FIG. 6B is a diagram illustrating a graph 380 of the example image 370 of FIG. 6A. As shown in FIG. 6A, the image 370 has a first region 372 and second regions 374. The first region 372 is a line indicative of light present in the image 370 and the second region is indicative of a background of the image 370 where the background is nearly featureless. A column 376 comprises classes of pixels (e.g., a first class, a second class, a third class, and so on) satisfying different brightness thresholds (e.g., a first threshold, a second threshold, a third threshold, and so on) present in the image 370 across the first region 372 and the second regions 374. The graph 380 illustrates the distribution of these classes of pixels. For example, bars 382 are indicative of a number of a first class of pixels (e.g., red pixels) that satisfy a first brightness threshold and are present in the column 376 of the image 370 across the first region 372. In another example, bars 384 are indicative of a number of a second class of pixels (e.g., orange pixels) that satisfy a second brightness threshold and are present in the column 376 of the image 370 across the first region 372. In another example, bars 386 are indicative of a number of a third class of pixels (e.g., yellow pixels)

that satisfy a third brightness threshold and are present in the column 376 of the image 370 across the first region 372. In yet another example, bars 388 are indicative of a number of a fourth class of pixels (e.g., green pixels) that satisfy a fourth brightness threshold and are present in the column 376 of the image 370 across the first region 372. Lastly, bars 390 are indicative of a number of pixels (e.g., blue pixels) that are present in the column 376 of the image 370 across the second regions 374. As shown in FIG. 6B, based on the distribution of the classes of pixels (e.g., a bell curve including a peak of a first class of pixels via bars 382), the image 380 is appropriately exposed.

Referring back to FIG. 4, if the system determines the average number of the first class of pixels per column of pixels is within the predetermined range, then process proceeds to step 310. In step 310, the system determines whether to capture additional images utilizing the first exposure of the imager(s) 134. If the system determines to capture additional images utilizing the first exposure of the imager(s) 134, then the process returns to step 302 to capture another image of the object 152.

Alternatively, if the system determines the average number of the first class of pixels per column of pixels is not within the predetermined range, then process proceeds to step 308. In step 308, the system modifies the first exposure time of the imager(s) 134 by one of decreasing the first exposure time of the imager(s) 134 or increasing the first exposure time of the imager(s) 134 based on a classification (e.g., over exposed or under exposed) of the first image. Step 308 is described in further detail below in relation to FIGS. 7A and 7B. The process then proceeds to step 310. In step 310, the system captures, via the imaging assembly 126 of the device 104, a second image of the object 152 based on the modified first exposure time of the imager(s) 134. The second image may have a third region and a fourth region where the third region is a line indicative of light present in the second image and the fourth region is indicative of a background of the second image. For example, the second image may be a laser profile image where the third region is a line indicative of laser light present in the second image and the fourth region is indicative of a background of the second image. In an embodiment, a user may define a region of interest (ROI) of the third region. The third region may include various classes of pixels (e.g., a first class, a second class, a third class, and so on) satisfying different brightness thresholds present in the second image.

It should be understood that the system may store an image profile after each instance of step 306 and combine the stored one or more image profiles upon a negative determination at step 310 to generate a point cloud of the object 152.

Figure 7A:
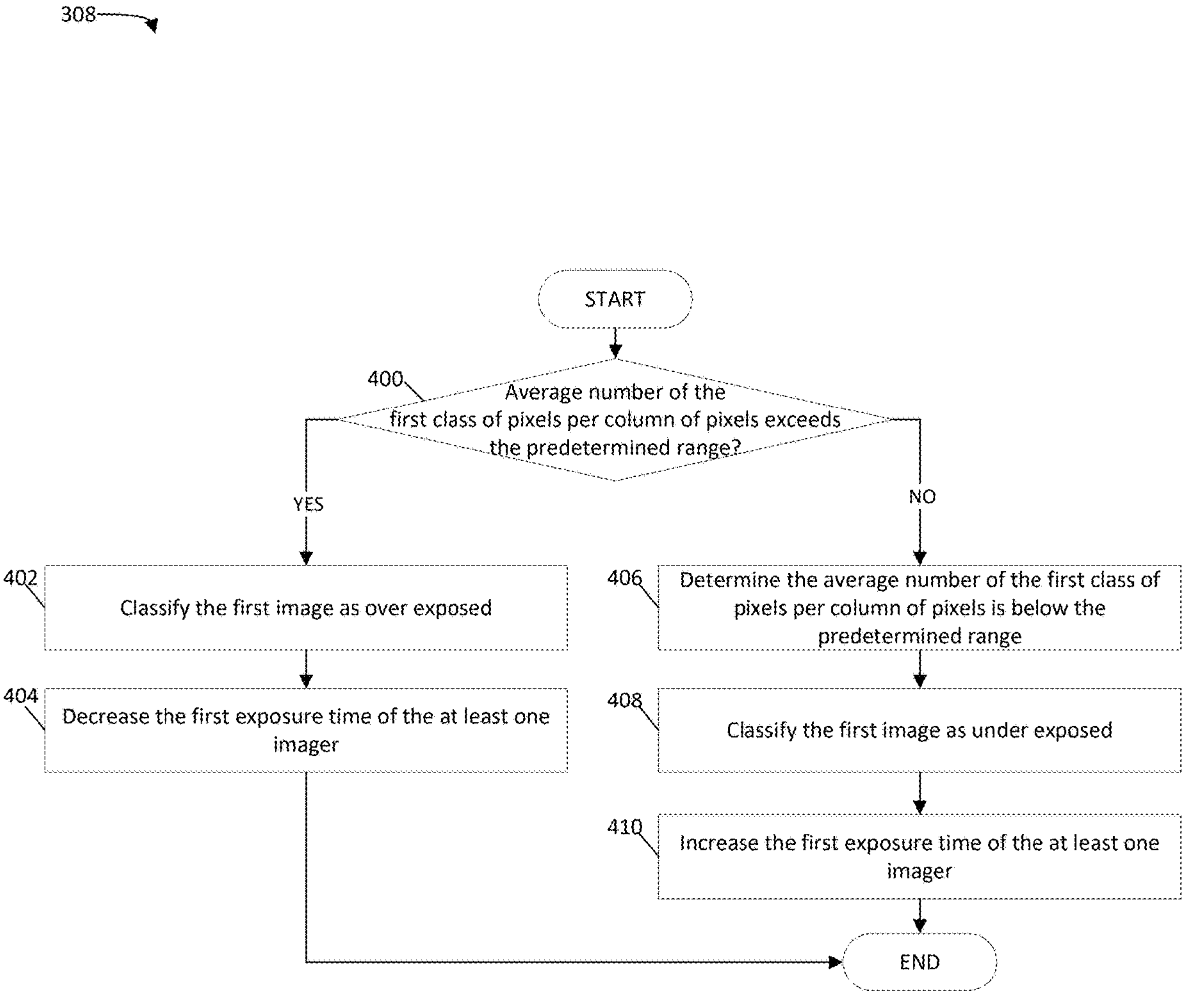
FIG. 7A is a flowchart illustrating an example embodiment of step 308 of FIG. 4 in greater detail.

FIG. 7A is a flowchart illustrating an example embodiment of step 308 of FIG. 4 in greater detail. For example, FIG. 7A is a flowchart illustrating processing steps associated with modifying the first exposure time of the imager(s) 134 by one of decreasing the first exposure time of the imager(s) 134 or increasing the first exposure time of the imager(s) 134 based on a classification (e.g., over exposed or under exposed) of the first image. Beginning in step 400, the system determines whether the average number of the first class of pixels per column of pixels exceeds the predetermined range. If the system determines the average number of the first class of pixels per column of pixel exceeds the predetermined range, then the process proceeds to step 402. In step 402, the system classifies the first image as over exposed. Then, in step 404, the system decreases the first exposure of the imager(s) 134. Step 404 will be described in further detail below in relation to FIG. 8 and FIGS. 9A-B. Alternatively, if the system determines the average number of the first class of pixels per column of pixel does not exceed the predetermined range, then the process proceeds to step 406. In step 406, the system determines the average number of the first class of pixels per column of pixels is below the predetermined range. In step 408, the system classifies the first image as under exposed (e.g., not comprising any or a sufficient number of bright pixels per column). Then, in step 410, the system increases the first exposure of the imager(s) 134. Step 410 will be described in further detail below in relation to FIG. 10 and FIGS. 11A-B.

Figure 7B:
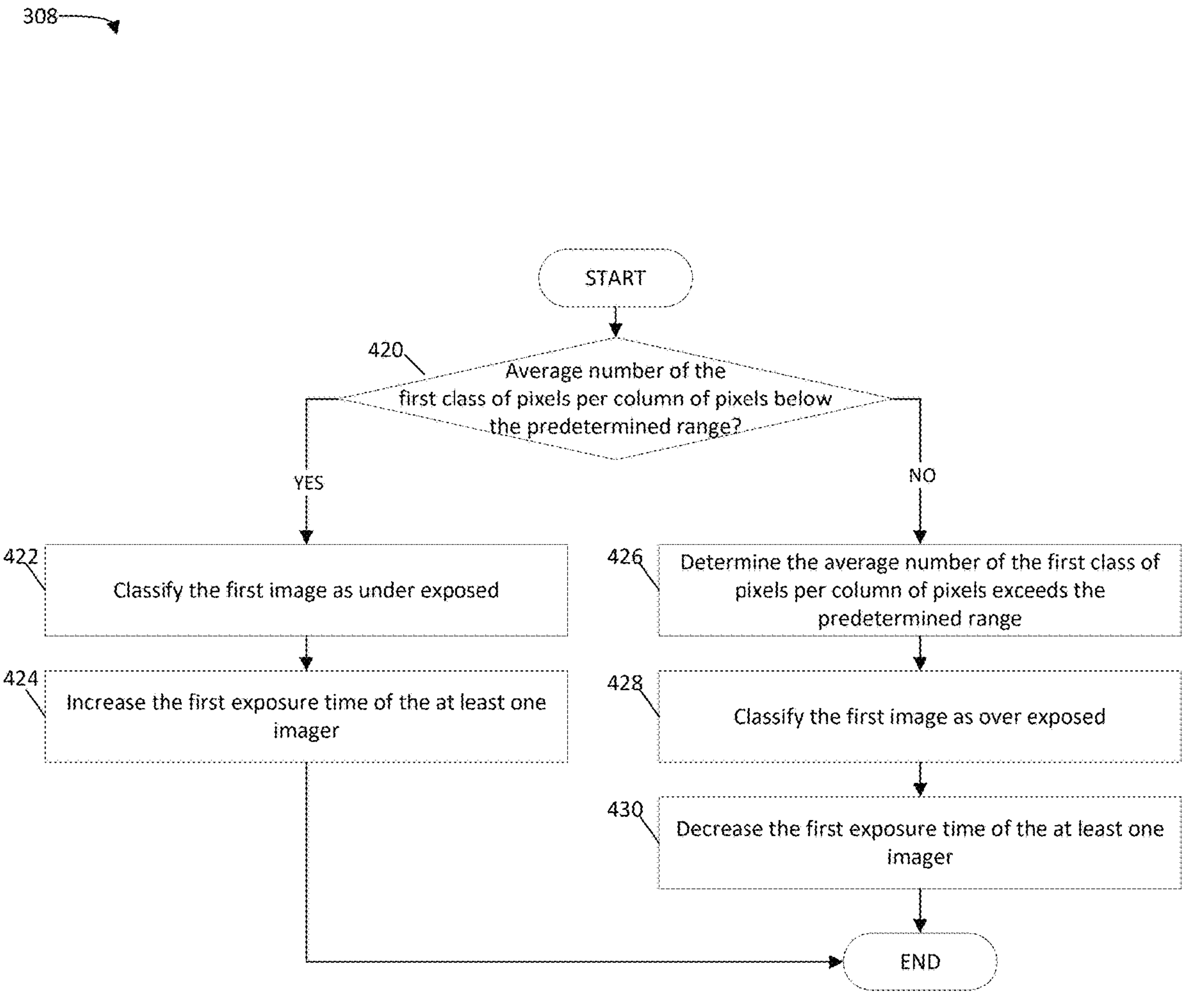
FIG. 7B is a flowchart illustrating another example embodiment of step 308 of FIG. 4 in greater detail.

FIG. 7B is a flowchart illustrating another example embodiment of step 308 of FIG. 4 in greater detail. For example, FIG. 7B is a flowchart illustrating processing steps associated with modifying the first exposure time of the imager(s) 134 by one of decreasing the first exposure time of the imager(s) 134 or increasing the first exposure time of the imager(s) 134 based on a classification (e.g., over exposed or under exposed) of the first image. Beginning in step 420, the system determines whether the average number of the first class of pixels per column is below the predetermined range. If the system determines the average number of the first class of pixels per column is below the predetermined range, then the process proceeds to step 422. In step 422, the system classifies the first image as under exposed. Then, in step 424, the system increases the first exposure time of the imager(s) 134. Step 424 will be described in further detail below in relation to FIG. 10 and FIGS. 11A-B. Alternatively, if the system determines the average number of the first class of pixels per column is not below the predetermined range, then the process proceeds to step 426. In step 426, the system determines the average number of the first class of pixels per column of pixels exceeds the predetermined range. In step 428, the system classifies the first image as over exposed. Then, in step 430, the system decreases the first exposure time of the imager(s) 134. Step 430 will be described in further detail below in relation to FIG. 8 and FIGS. 9A-B.

Figure 8:
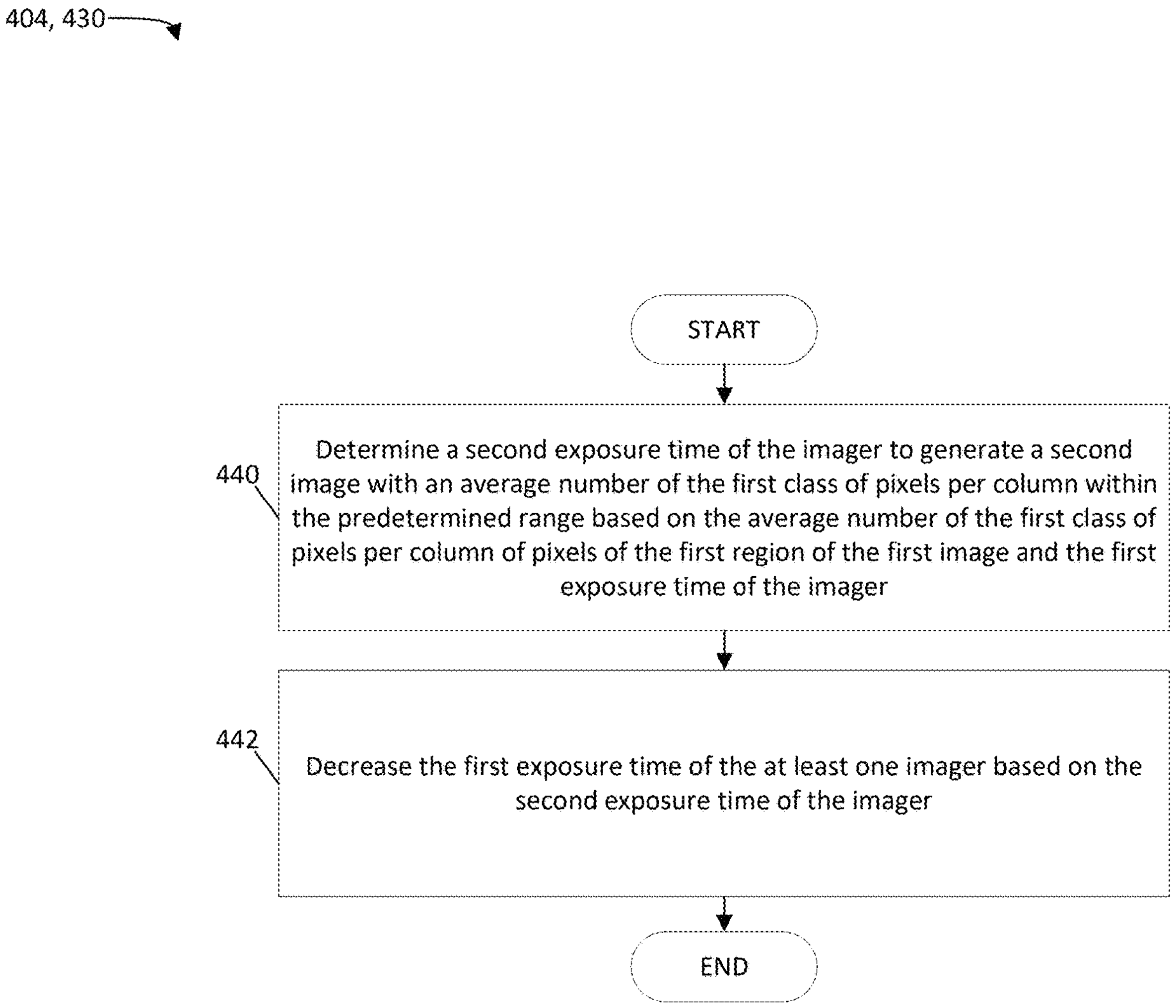
FIG. 8 is a flowchart illustrating step 404 of FIG. 7A and step 430 of FIG. 7B in greater detail.

FIG. 8 is a flowchart illustrating step 404 of FIG. 7A and step 430 of FIG. 7B in greater detail. For example, FIG. 8 is a flowchart illustrating processing steps associated with decreasing the first exposure time of the imager(s) 134. In step 440, the system determines a second exposure time of the imager(s) 134 to generate a second image with an average number of a first class of pixels per column of pixels within the predetermined range based on the average number of the first class of pixels per column of pixels of the first region and the first exposure time of the imager(s) 134. The second exposure time of the imager(s) 134 is indicative of the first exposure time of the imager(s) 134 modified by an adjustment factor of Exp(t)/Exp(m). Exp(t) is indicative of an exposure time for an average number of a first class of pixels per column in a center of the predetermined range based on a brightness of the light source (e.g., a laser) and Exp(m) is indicative of the first exposure time of the average number of first class of pixels per column of pixels of the first region based on the same brightness of the light source (e.g., a laser). Then, in step 442, the system decreases the first exposure time of the imager(s) 134, based on the second exposure time of the imager(s) 134, to be within the predetermined range.

Figure 9A:
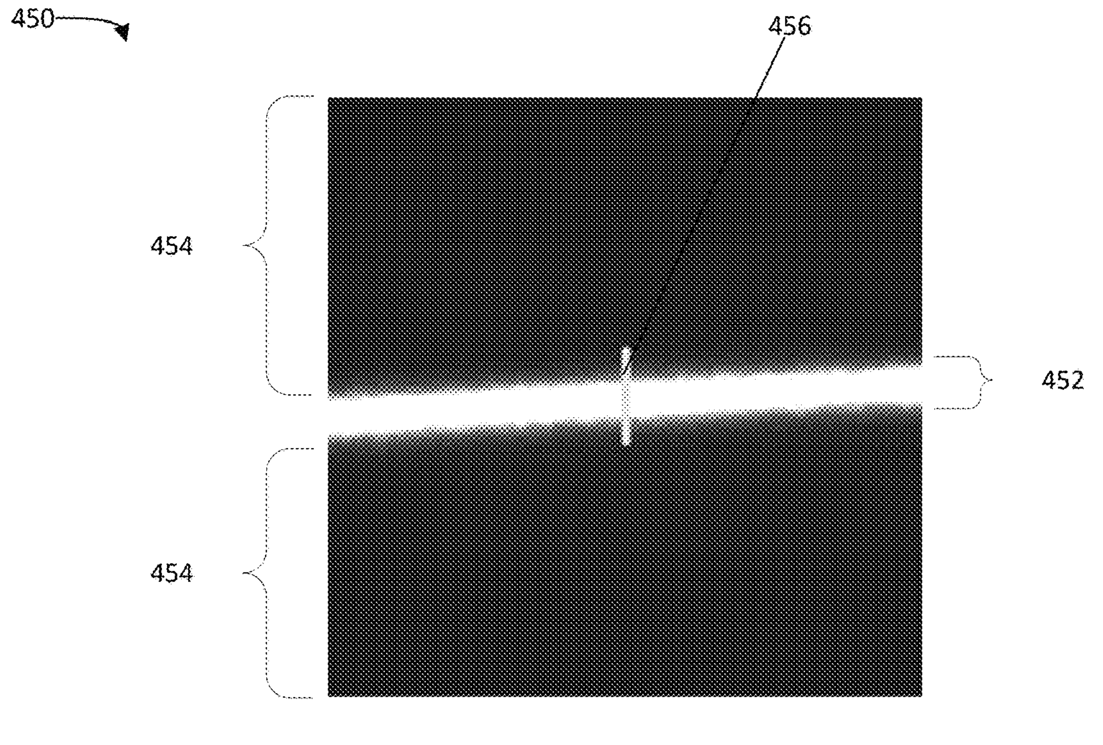
FIG. 9A is a diagram illustrating an example image captured by the device of FIGS. 2A-B.
Figure 9B:
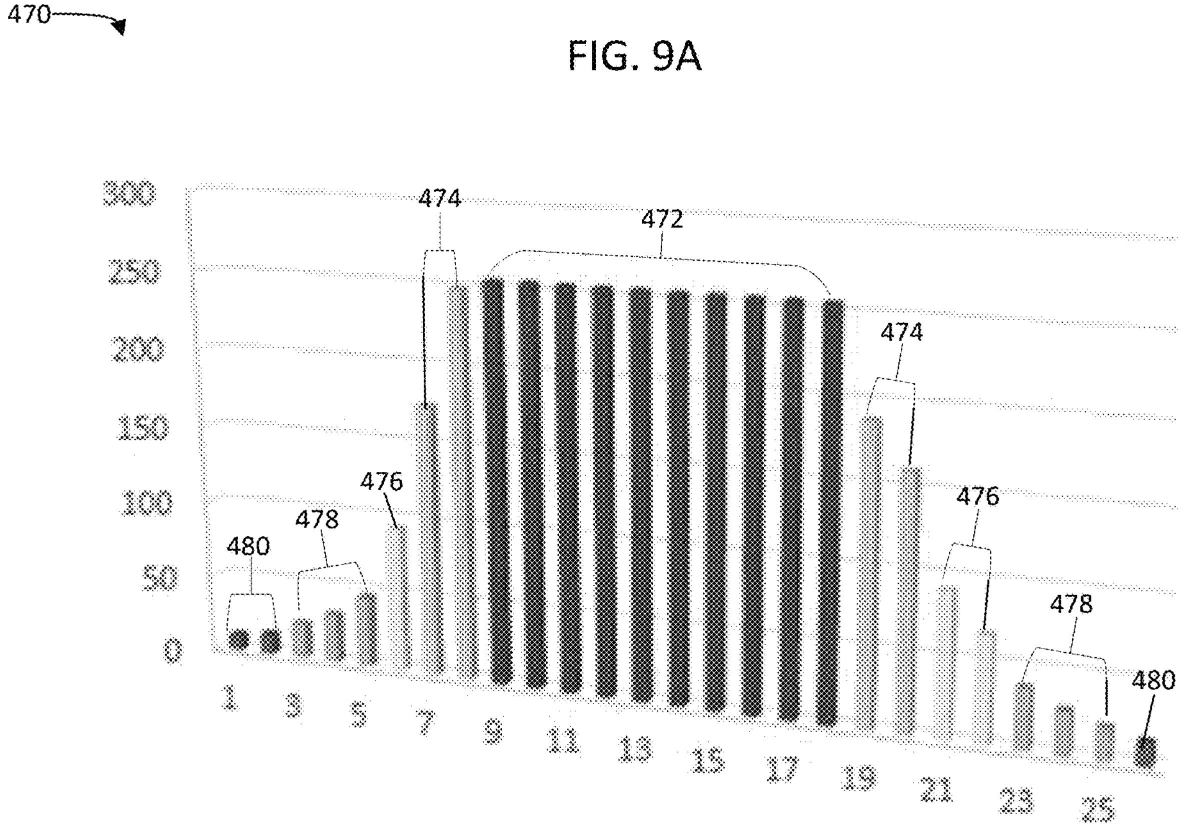
FIG. 9B is a diagram illustrating a graph of the example image of FIG. 9A.

FIG. 9A is a diagram illustrating an example image 450 captured by the device 104 of FIGS. 2A-B and FIG. 9B is a diagram illustrating a graph 470 of the example image 450 of FIG. 9A. As shown in FIG. 9A, the image 450 has a first region 452 and second regions 454. The first region 452 is a line indicative of light present in the image 450 and the second region is indicative of a background of the image 450 where the background is nearly featureless. A column 456 comprises classes of pixels (e.g., a first class, a second class, a third class, and so on) satisfying different brightness thresholds (e.g., a first threshold, a second threshold, a third threshold, and so on) present in the image 450 across the first region 452 and the second regions 454. The graph 470 illustrates the distribution of these classes of pixels. For example, bars 472 are indicative of a number of a first class of pixels (e.g., red pixels) that satisfy a first brightness threshold and are present in the column 456 of the image 450 across the first region 452. In another example, bars 474 are indicative of a number of a second class of pixels (e.g., orange pixels) that satisfy a second brightness threshold and are present in the column 456 of the image 450 across the first region 452. In another example, bars 476 are indicative of a number of a third class of pixels (e.g., yellow pixels) that satisfy a third brightness threshold and are present in the column 456 of the image 450 across the first region 452. In yet another example, bars 478 are indicative of a number of a fourth class of pixels (e.g., green pixels) that satisfy a fourth brightness threshold and are present in the column 456 of the image 450 across the first region 452. Lastly, bars 480 are indicative of a number of pixels (e.g., blue pixels) that are present in the column 456 of the image 450 across the second regions 454. As shown in FIG. 9B, based on the distribution of the classes of pixels including a flat top of a first class of pixels via bars 472, the image 380 is over exposed.

Figure 10:
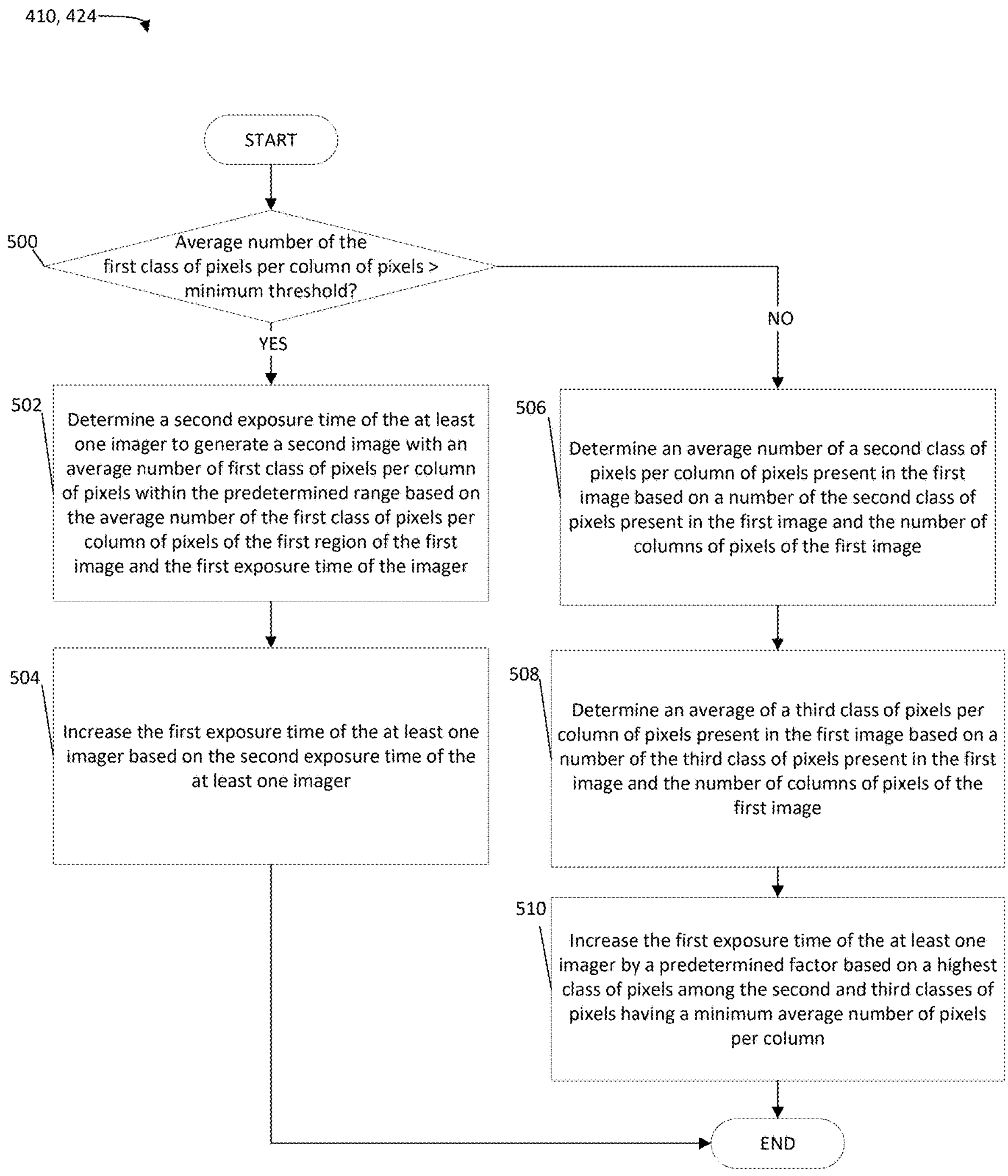
FIG. 10 is a flowchart illustrating step 410 of FIG. 7A and step 424 of FIG. 7B in greater detail.

FIG. 10 is a flowchart illustrating step 410 of FIG. 7A and step 424 of FIG. 7B in greater detail. For example, FIG. 10 is a flowchart illustrating processing steps associated with increasing the first exposure time of the imager(s) 134.

In step 500, the system determines whether the average number of the first class of pixels per column of pixels exceeds a minimum threshold. If the system determines, the average number of the first class of pixels per column of pixels exceeds the minimum threshold, then the process proceeds to step 502. In step 502, the system determines a second exposure time of the imager(s) 134 to generate a second image an average number of a first class of pixels per column of pixels within the predetermined range based on the average number of the first class of pixels per column of pixels of the first region and the first exposure time of the imager(s) 134. Then, in step 504, the system increases the first exposure time of the imager(s) 134, based on the second exposure time of the imager(s) 134, to be within the predetermined range. Alternatively, if the system determines the average number of the first class of pixels per column of pixels does not exceed the minimum threshold, then the process proceeds to step 506. In step 506, the system determines an average number of a second class of pixels (e.g., orange pixels) per column of pixels present in the first image based on a number of the second class of pixels present in the first image and the number of columns of pixels of the first image. Then, in step 508, the system determines an average of a third class of pixels (e.g., yellow pixels) per column of pixels present in the first image based on a number of the third class of pixels present in the first image and the number of columns of pixels of the first image. In step 510, the system increases the first exposure time of the imager(s) 134 by a predetermined factor based on a highest class of pixels among the second and third classes of pixels having a minimum average number of pixels per column.

Figure 11A:
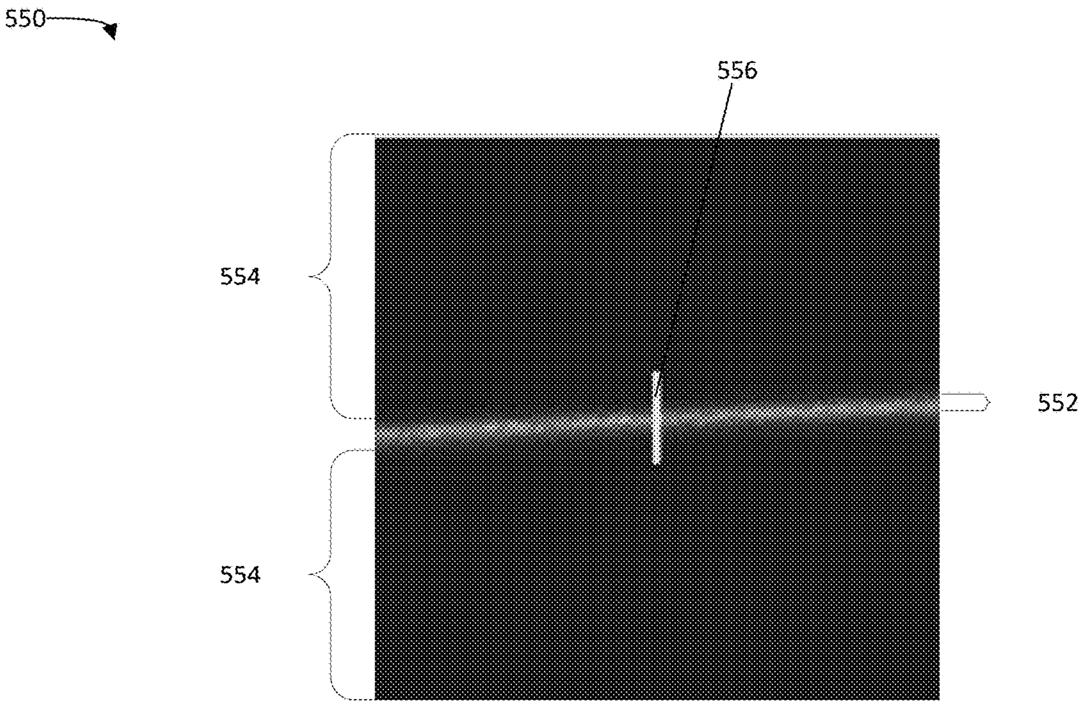
FIG. 11A is a diagram illustrating an example image captured by the device of FIGS. 2A-B.
Figure 11B:
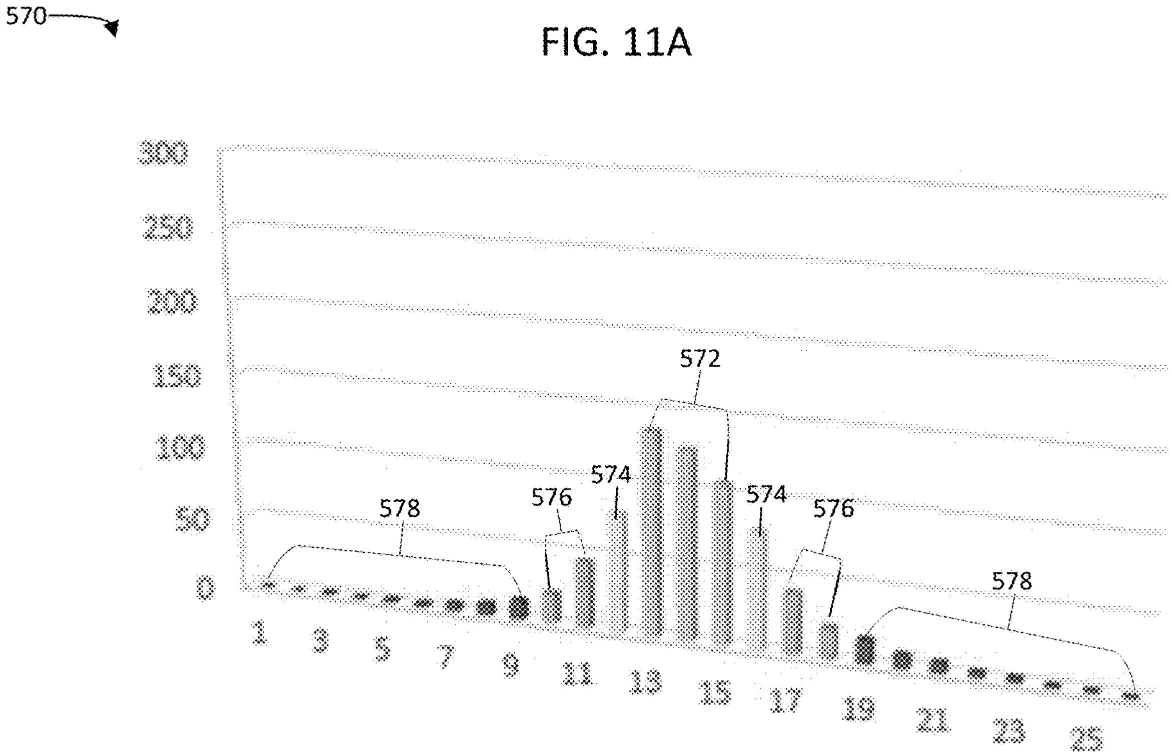
FIG. 11B is a diagram illustrating a graph of the example image of FIG. 11A.

FIG. 11A is a diagram illustrating an example image 550 captured by the device 104 of FIGS. 2A-B and FIG. 11B is a diagram illustrating a graph 570 of the example image 550 of FIG. 11A. As shown in FIG. 11A, the image 550 has a first region 552 and second regions 554. The first region 552 is a line indicative of light present in the image 550 and the second region is indicative of a background of the image 550 where the background is nearly featureless. A column 556 comprises classes of pixels (e.g., a first class, a second class, a third class, and so on) satisfying different brightness thresholds (e.g., a first threshold, a second threshold, a third threshold, and so on) present in the image 550 across the first region 552 and the second regions 554. The graph 570 illustrates the distribution of these classes of pixels. For example, bars 572 are indicative of a number of a second class of pixels (e.g., orange pixels) that satisfy a second brightness threshold and are present in the column 556 of the image 550 across the first region 552. In another example, bars 574 are indicative of a number of a third class of pixels (e.g., yellow pixels) that satisfy a third brightness threshold and are present in the column 556 of the image 550 across the first region 552. In yet another example, bars 576 are indicative of a number of a fourth class of pixels (e.g., green pixels) that satisfy a fourth brightness threshold and are present in the column 556 of the image 550 across the first region 552. Lastly, bars 578 are indicative of a number of pixels (e.g., blue pixels) that are present in the column 556 of the image 550 across the second regions 554. As shown in FIG. 11B, based on the distribution of the classes of pixels and the omission of a first class of pixels, the image 570 is under exposed.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A method, comprising:

capturing, via an imaging assembly of a device, a first image of an object, the imaging assembly having a light source and at least one imager having a first exposure time during capture of the first image, and the first image having a first region and a second region;

determining an average number of a first class of pixels per column of pixels present in the first image based on a number of the first class of pixels present in the first image and a number of columns of pixels of the first image;

determining whether the average number of the first class of pixels per column of pixels is within a predetermined range;

responsive to determining the average number of the first class of pixels per column of pixels is not within the predetermined range, modifying the first exposure time of the at least one imager by one of decreasing the first exposure time of the at least one imager or increasing the first exposure time of the at least one imager based on a classification of the first image, wherein the first region is a line indicative of light present in the first image, the second region is indicative of a background of the first image, and the first class of pixels is indicative of pixels satisfying a brightness threshold present in the first image.

2. The method of claim 1, further comprising projecting, by the imaging assembly, light onto the object during capture of the first image.

3. The method of claim 1, further comprising capturing, via the imaging assembly of the device, a second image of the object based on a modified first exposure time of the at least one imager, the second image having a third region and a fourth region, wherein the third region is a line indicative of light present in the second image, and the fourth region is indicative of a background of the second image.

4. The method of claim 1, wherein the device is a three-dimensional profiler;

the light source is a laser and the light present in the first image is laser light; and the first image is a laser profile image.

5. The method of claim 1, wherein the average number of the first class of pixels per column of pixels is one of a floating point or a fixed point value; and the predetermined range is indicative of a target range of the average number of the first class of pixels per column of pixels comprising a thickness of the line.

6. The method of claim 1, wherein modifying the first exposure time of the at least one imager comprises:

determining whether the average number of the first class of pixels per column of pixels exceeds the predetermined range;

responsive to determining the average number of the first class of pixels per column of pixels exceeds the predetermined range, classifying the first image as over exposed, and decreasing the first exposure time of the at least one imager; and responsive to determining the average number of the first class of pixels per column of pixels does not exceed the predetermined range, determining the average number of the first class of pixels per column of pixels is below the predetermined range, classifying the first image as under exposed, and increasing the first exposure time of the at least one imager.

7. The method of claim 1, wherein modifying the first exposure time of the at least one imager comprises:

determining whether the average number of the first class of pixels per column of pixels is below the predetermined range;

responsive to determining the average number of the first class of pixels per column of pixels is below the predetermined range, classifying the first image as under exposed, and increasing the first exposure time of the at least one imager; and responsive to determining the average number of the first class of pixels per column of pixels is not below the predetermined range, determining the average number of the first class of pixels per column of pixels exceeds the predetermined range, classifying the first image as over exposed, and decreasing the first exposure time of the at least one imager.

8. The method of claim 1, wherein decreasing the first exposure time of the at least one imager comprises:

determining a second exposure time of the imager to generate a second image with an average number of first class of pixels per column of pixels within the predetermined range based on the average number of first class of pixels per column of pixels of the first region and the first exposure time of the at least one imager; and decreasing the first exposure time of the at least one imager, based on the second exposure time of the at least one imager, to be within the predetermined range.

9. The method of claim 8, wherein the second exposure time of the at least one imager is indicative of the first exposure time of the at least one imager modified by an adjustment factor of Exp(t)/Exp(m) where Exp(t) is indicative of an exposure time for an average number of a first class of pixels per column in a center of the predetermined range based on a brightness of the laser and Exp(m) is indicative of the first exposure time of the average number of first class of pixels per column of pixels of the first region based on the same brightness of the laser.

10. The method of claim 1, increasing the first exposure time of the at least one imager comprises:

determining whether the average number of the first class of pixels per column of pixels exceeds a minimum threshold;

responsive to determining the average number of the first class of pixels exceeds the minimum threshold, determining a second exposure time of the at least one imager to generate a second target range of another average number of first class of pixels per column of pixels of the first region based on the average number of first class of pixels per column of pixels of the first region and the first exposure time of the at least one imager, and increasing the first exposure time of the at least one imager, based on the second exposure time of the imager, to be within the second target range of the another average number of the first class of pixels per column of pixels of the first region; and responsive to determining the average number of the first class of pixels per column of pixels does not exceed the minimum threshold, determining an average number of a second class of pixels per column of pixels present in the first image based on a number of the second class of pixels present in the first image and the number of columns of pixels of the first image, determining an average number of a third class of pixels per column of pixels present in the first image based on a number of the third class of pixels present in the first image and the number of columns of pixels of the first image, and increasing the first exposure time of the imager by a predetermined factor based on a highest class of pixels among the second and third classes of pixels having a minimum average number of pixels per column.

11. A device, comprising:

an imaging assembly having a light source and at least one imager;

one or more processors; and a non-transitory computer-readable memory coupled to the one or more processors, the memory storing instructions thereon that, when executed by the one or more processors, cause the one or more processors to:

receive a first image of an object, the first image being captured by the at least one imager utilizing a first exposure time, and the first image having a first region and a second region;

determine an average number of a first class of pixels per column of pixels present in the first image based on a number of the first class of pixels present in the first image and a number of columns of pixels of the first image;

determine whether the average number of the first class of pixels per column of pixels is within a predetermined range;

responsive to determining the average number of the first class of pixels per column of pixels is not within the predetermined range, modifying the first exposure time of the at least one imager by one of decreasing the first exposure time of the at least one imager or increasing the first exposure time of the at least one imager based on a classification of the first image, wherein the first region is a line indicative of light present in the first image, the second region is indicative of a background of the first image, and the first class of pixels is indicative of pixels satisfying a brightness threshold present in the first image.

12. The device of claim 11, wherein the instructions, when executed, further cause the one or more processors to project, by the imaging assembly, light onto the object during capture of the first image.

13. The device of claim 11, wherein the instructions, when executed, further cause the one or more processors to receive a second image having a third region and a fourth region, the second image being captured by the at least one imager utilizing a modified first exposure time of the at least one imager, wherein the third region is a line indicative of laser light present in the second image, and the fourth region is indicative of a background of the second image.

14. The device of claim 11, wherein the device is a three-dimensional profiler;

the light source is a laser and the light present in the first image is laser light; and the first image is a laser profile image.

15. The device of claim 11, wherein the average number of the first class of pixels per column of pixels is one of a floating point or a fixed point value; and the predetermined range is indicative of a target range of the average number of the first class of pixels per column of pixels comprising a thickness of the line.

16. The device of claim 11, wherein the instructions, when executed, cause the one or more processors to modify the first exposure time of the at least one imager by:

determining whether the average number of the first class of pixels per column of pixels exceeds the predetermined range;

responsive to determining the average number of the first class of pixels per column of pixels exceeds the predetermined range, classifying the first image as over exposed, and decreasing the first exposure time of the at least one imager; and responsive to determining the average number of the first class of pixels per column of pixels does not exceed the predetermined range, determining the average number of the first class of pixels per column of pixels is below the predetermined range, classifying the first image as under exposed, and increasing the first exposure time of the at least one imager.

17. The device of claim 11, wherein the instructions, when executed, cause the one or more processors to modify the first exposure time of the at least one imager by:

determining whether the average number of the first class of pixels per column of pixels is below the predetermined range;

responsive to determining the average number of the first class of pixels per column of pixels is below the predetermined range, classifying the first image as under exposed, and increasing the first exposure time of the at least one imager; and responsive to determining the average number of the first class of pixels per column of pixels is not below the predetermined range, determining the average number of the first class of pixels per column of pixels exceeds the predetermined range, classifying the first image as over exposed, and decreasing the first exposure time of the at least one imager.

18. The device of claim 11, wherein the instructions, when executed, further cause the one or more processors to decrease the first exposure time of the at least one imager by:

determining a second exposure time of the at least one imager to generate a second image with an average number of first class of pixels per column within the predetermined range based on the average number of first class of pixels per column of pixels of the first region and the first exposure time of the at least one imager; and decreasing the first exposure time of the at least one imager, based on the second exposure time of the at least one imager, to be within the predetermined range.

19. The device of claim 18, wherein the second exposure time of the at least one imager is indicative of the first exposure time of the at least one imager modified by an adjustment factor of Exp(t)/Exp(m) where Exp(t) is indicative of an exposure time for an average number of a first class of pixels per column in a center of the predetermined range based on a brightness of the laser and Exp(m) is indicative of the first exposure time of the average number of first class of pixels per column of pixels of the first region based on the same brightness of the laser.

20. The device of claim 11, wherein the instructions, when executed, further cause the one or more processors to increase the first exposure time of the at least one imager by:

determining whether the average number of the first class of pixels per column of pixels exceeds a minimum threshold;

responsive to determining the average number of the first class of pixels exceeds the minimum threshold, determining a second exposure time of the at least one imager to generate a second target range of another average number of first class of pixels per column of pixels of the first region based on the average number of first class of pixels per column of pixels of the first region and the first exposure time of the at least one imager, and increasing the first exposure time of the at least one imager, based on the second exposure time of the at least one imager, to be within the second target range of the another average number of the first class of pixels per column of pixels of the first region; and responsive to determining the average number of the first class of pixels per column of pixels does not exceed the minimum threshold, determining an average number of a second class of pixels per column of pixels present in the first image based on a number of the second class of pixels present in the first image and the number of columns of pixels of the first image, determining an average number of a third class of pixels per column of pixels present in the first image based on a number of the third class of pixels present in the first image and the number of columns of pixels of the first image, and increasing the first exposure time of the at least one imager by a predetermined factor based on a highest class of pixels among the second and third classes of pixels having a minimum average number of pixels per column.

21. A non-transitory computer-readable medium storing instructions thereon that, when executed by one or more processors, cause the one or more processors to:

receive, via an imaging assembly of a device, a first image of an object, the imaging assembly having a light source and at least one imager having a first exposure time during capture of the first image, and the first image having a first region and a second region;

determine an average number of a first class of pixels per column of pixels present in the first image based on a number of the first class of pixels present in the first image and a number of columns of pixels of the first image;

determine whether the average number of the first class of pixels per column of pixels is within a predetermined range;

responsive to determining the average number of the first class of pixels per column of pixels is not within the predetermined range, modifying the first exposure time of the at least one imager by one of decreasing the first exposure time of the at least one imager or increasing the first exposure time of the at least one imager based on a classification of the first image, wherein the first region is a line indicative of light present in the first image, the second region is indicative of a background of the first image, and the first class of pixels is indicative of pixels satisfying a brightness threshold present in the first image.

22. The non-transitory computer-readable medium of claim 21, wherein the instructions, when executed, further cause the one or more processors to project, by the imaging assembly, light onto the object during capture of the first image.

23. The non-transitory computer-readable medium of claim 21, wherein the instructions, when executed, further cause the one or more processors to receive a second image having a third region and a fourth region, the second image being captured by the at least one imager utilizing a modified first exposure time of the at least one imager, wherein the third region is a line indicative of laser light present in the second image, and the fourth region is indicative of a background of the second image.

24. The non-transitory computer-readable medium of claim 21, wherein the device is a three-dimensional profiler;

the light source is a laser and the light present in the first image is laser light; and the first image is a laser profile image.

25. The non-transitory computer-readable medium of claim 21, wherein the average number of the first class of pixels per column of pixels is one of a floating point or a fixed point value; and the predetermined range is indicative of a target range of the average number of the first class of pixels per column of pixels comprising a thickness of the line.

26. The non-transitory computer-readable medium of claim 21, wherein the instructions, when executed, further cause the one or more processors to modify the first exposure time of the at least one imager by:

determining whether the average number of the first class of pixels per column of pixels exceeds the predetermined range;

responsive to determining the average number of the first class of pixels per column of pixels exceeds the predetermined range, classifying the first image as over exposed, and decreasing the first exposure time of the at least one imager; and responsive to determining the average number of the first class of pixels per column of pixels does not exceed the predetermined range, determining the average number of the first class of pixels per column of pixels is below the predetermined range, classifying the first image as under exposed, and increasing the first exposure time of the at least one imager.

27. The non-transitory computer-readable medium of claim 21, wherein the instructions, when executed, further cause the one or more processors to modify the first exposure time of the at least one imager by:

determining whether the average number of the first class of pixels per column of pixels is below the predetermined range;

responsive to determining the average number of the first class of pixels per column of pixels is below the predetermined range, classifying the first image as under exposed, and increasing the first exposure time of the at least one imager; and responsive to determining the average number of the first class of pixels per column of pixels is not below the predetermined range, determining the average number of the first class of pixels per column of pixels exceeds the predetermined range, classifying the first image as over exposed, and decreasing the first exposure time of the at least one imager.

28. The non-transitory computer-readable medium of claim 21, wherein the instructions, when executed, further cause the one or more processors to decrease the first exposure time of the at least one imager by:

determining a second exposure time of the at least one imager to generate a second image with an average number of first class of pixels per column of pixels within the predetermined range based on the average number of first class of pixels per column of pixels of the first region and the first exposure time of the at least one imager; and decreasing the first exposure time of the at least one imager, based on the second exposure time of the at least one imager, to be within the predetermined range.

29. The non-transitory computer-readable medium of claim 28, wherein the second exposure time of the at least one imager is indicative of the first exposure time of the at least one imager modified by an adjustment factor of Exp(t)/Exp(m) where Exp(t) is indicative of an exposure time for an average number of a first class of pixels per column in a center of the predetermined range based on a brightness of the laser and Exp(m) is indicative of the first exposure time of the average number of first class of pixels per column of pixels of the first region based on the same brightness of the laser.

30. The non-transitory computer-readable medium of claim 21, wherein the instructions, when executed, further cause the one or more processors to increase the first exposure time of the at least one imager by:

determining whether the average number of the first class of pixels per column of pixels exceeds a minimum threshold;

responsive to determining the average number of the first class of pixels exceeds the minimum threshold, determining a second exposure time of the at least one imager to generate a second target range of another average number of first class of pixels per column of pixels of the first region based on the average number of first class of pixels per column of pixels of the first region and the first exposure time of the at least one imager, and increasing the first exposure time of the at least one imager, based on the second exposure time of the at least one imager, to be within the second target range of the another average number of the first class of pixels per column of pixels of the first region; and responsive to determining the average number of the first class of pixels per column of pixels does not exceed the minimum threshold, determining an average number of a second class of pixels per column of pixels present in the first image based on a number of the second class of pixels present in the first image and the number of columns of pixels of the first image, determining an average number of a third class of pixels per column of pixels present in the first image based on a number of the third class of pixels present in the first image and the number of columns of pixels of the first image, and increasing the first exposure time of the at least one imager by a predetermined factor based on a highest class of pixels among the second and third classes of pixels having a minimum average number of pixels per column.

* * * * *